US010077345B2

(12) United States Patent
Odle et al.

(10) Patent No.: US 10,077,345 B2
(45) Date of Patent: Sep. 18, 2018

(54) CAPACITOR FILMS, METHODS OF MANUFACTURE, AND ARTICLES MANUFACTURED THEREFROM

(71) Applicant: SABIC GLOBAL TECHNOLOGIES B.V., Bergen op Zoom (NL)

(72) Inventors: Roy Ray Odle, Mount Vernon, IN (US); Matthew Frank Niemeyer, North Chatham, NY (US); Mark A. Sanner, Evansville, IN (US); Anne E. Bolvari, West Chester, PA (US); Neal Pfeiffenberger, Conshohocken, PA (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/600,879

(22) Filed: May 22, 2017

(65) Prior Publication Data

US 2017/0253705 A1 Sep. 7, 2017

Related U.S. Application Data

(63) Continuation-in-part of application No. 14/291,989, filed on May 30, 2014, now Pat. No. 9,659,711,
(Continued)

(51) Int. Cl.
*B29C 47/92* (2006.01)
*C08J 5/18* (2006.01)
(Continued)

(52) U.S. Cl.
CPC ............. *C08J 5/18* (2013.01); *B29C 35/0805* (2013.01); *B29C 47/0004* (2013.01);
(Continued)

(58) Field of Classification Search
CPC ........ H01G 9/028; H01G 9/042; H01G 9/045; H01G 9/15; B29C 47/04; B29C 47/0021; B29C 47/0057

See application file for complete search history.

(56) References Cited

U.S. PATENT DOCUMENTS 3,484,664 A 12/1969 Liddicoat
3,740,623 A 6/1973 Toro
(Continued)

FOREIGN PATENT DOCUMENTS

EP 0984030 A2 3/2000
EP 2108673 A1 10/2009
(Continued)

OTHER PUBLICATIONS

International Search Report for International Application No. PCT/US2014/040261, Application Filing Date May 30, 2014, dated Oct. 14, 2014, 5 pages.
(Continued)

*Primary Examiner* — Nguyen Ha
(74) *Attorney, Agent, or Firm* — Cantor Colburn LLP

(57) ABSTRACT

A polyetherimide film comprising a fluoropolymer and an extruded polyetherimide comprising units derived from polymerization of an aromatic dianhydride with a diamine selected from a meta-phenylene diamine, a para-phenylene diamine, and a combination thereof, wherein the polyetherimide is endcapped with an a substituted or unsubstituted aromatic primary monoamine; and wherein the polyetherimide film comprises at least 90 weight % of the polyetherimide before extrusion.

23 Claims, 1 Drawing Sheet

Related U.S. Application Data which is a continuation of application No. PCT/US2014/040261, filed on May 30, 2014.

(60) Provisional application No. 61/829,500, filed on May 31, 2013.

(51) Int. Cl.

| | | |
|---|---|---|
| *B29C 35/08* | (2006.01) | |
| *B29C 71/04* | (2006.01) | |
| *B29C 47/00* | (2006.01) | |
| *B29C 73/10* | (2006.01) | |
| *H01G 4/32* | (2006.01) | |
| *H01G 4/18* | (2006.01) | |
| B29L 31/34 | (2006.01) | |
| B29K 79/00 | (2006.01) | |
| B29K 105/24 | (2006.01) | |

(52) U.S. Cl.
CPC ...... *B29C 47/0021* (2013.01); *B29C 47/0057* (2013.01); *B29C 47/92* (2013.01); *B29C 71/04* (2013.01); *B29C 73/10* (2013.01); *H01G 4/18* (2013.01); *H01G 4/32* (2013.01); *B29C 2035/0827* (2013.01); *B29C 2947/92514* (2013.01); *B29C 2947/92695* (2013.01); *B29C 2947/92704* (2013.01); *B29K 2079/085* (2013.01); *B29K 2105/24* (2013.01); *B29K 2995/0051* (2013.01); *B29L 2031/3406* (2013.01)

(56) References Cited

U.S. PATENT DOCUMENTS

| | | | |
|---|---|---|---|
| 4,604,303 | A | 8/1986 | Takakura et al. |
| 4,679,122 | A | 7/1987 | Belke, Jr. et al. |
| 5,229,482 | A | 7/1993 | Brunelle |
| 5,260,407 | A | 11/1993 | Saruwatari et al. |
| 5,357,033 | A | 10/1994 | Bendler et al. |
| 5,636,100 | A | 6/1997 | Zheng et al. |
| 5,714,243 | A | 2/1998 | Mammino et al. |
| 6,033,483 | A | 3/2000 | Demaray et al. |
| 6,420,011 | B1 | 7/2002 | Tsunekawa et al. |
| 6,426,861 | B1 | 7/2002 | Munshi |
| 6,586,791 | B1 | 7/2003 | Lee et al. |
| 6,720,379 | B1 | 4/2004 | Campbell et al. |
| 6,919,422 | B2 | 7/2005 | Gallucci et al. |
| 6,974,620 | B1 | 12/2005 | Tsunekawa et al. |
| 7,071,282 | B2 | 7/2006 | Acar et al. |
| 7,079,372 | B2 | 7/2006 | Weber et al. |
| 7,745,516 | B2 | 6/2010 | Dueber et al. |
| 8,034,857 | B2 | 10/2011 | Kailasam et al. |
| 9,161,440 | B2 * | 10/2015 | Chan ................ C08G 73/1007 |
| 2003/0171494 | A1 | 9/2003 | Aramaki et al. |
| 2004/0247921 | A1 | 12/2004 | Dodsworth et al. |
| 2005/0080228 | A1 | 4/2005 | Silvi et al. |
| 2006/0069236 | A1 * | 3/2006 | Brunelle ................ C08G 75/23 |
| | | | 528/373 |
| 2006/0167216 | A1 * | 7/2006 | Johnson ................ C08G 65/40 |
| | | | 528/373 |
| 2006/0194070 | A1 | 8/2006 | Croll et al. |
| 2007/0108490 | A1 | 5/2007 | Tan et al. |
| 2007/0116976 | A1 | 5/2007 | Tan et al. |
| 2007/0117886 | A1 | 5/2007 | Tan et al. |
| 2007/0148467 | A1 | 6/2007 | St. Lawrence et al. |
| 2007/0169886 | A1 | 7/2007 | Watanabe et al. |
| 2007/0258190 | A1 | 11/2007 | Irwin et al. |
| 2008/0004404 | A1 | 1/2008 | Van De Grampel et al. |
| 2008/0044639 | A1 * | 2/2008 | Chan ..................... B82Y 30/00 |
| | | | 428/220 |
| 2008/0044682 | A1 | 2/2008 | Chan et al. |
| 2008/0123250 | A1 | 5/2008 | Tan et al. |
| 2009/0045544 | A1 | 2/2009 | Silvi et al. |
| 2009/0154057 | A1 | 6/2009 | Tan |
| 2009/0226711 | A1 | 9/2009 | Silvi et al. |
| 2009/0245547 | A1 | 10/2009 | Lee et al. |
| 2009/0258991 | A1 | 10/2009 | Yamaguchi et al. |
| 2010/0020468 | A1 | 1/2010 | Tan et al. |
| 2010/0079926 | A1 | 4/2010 | Tan et al. |
| 2010/0172066 | A1 | 7/2010 | Baer et al. |
| 2010/0246094 | A1 | 9/2010 | Tan et al. |
| 2010/0302707 | A1 | 12/2010 | Tan et al. |
| 2011/0012438 | A1 | 1/2011 | Kashiwagi et al. |
| 2011/0031845 | A1 | 2/2011 | Kashiwagi et al. |
| 2011/0075320 | A1 * | 3/2011 | Fang ..................... H01G 4/18 |
| | | | 361/311 |
| 2011/0117348 | A1 | 5/2011 | Takizawa et al. |
| 2011/0151187 | A1 * | 6/2011 | Ote ..................... B29C 47/0021 |
| | | | 428/141 |
| 2011/0216474 | A1 | 9/2011 | Grosrenaud et al. |
| 2011/0299222 | A1 | 12/2011 | Suzuki et al. |
| 2012/0081833 | A1 | 4/2012 | Cao et al. |
| 2012/0287555 | A1 * | 11/2012 | Silvi ..................... C08J 5/18 |
| | | | 361/301.5 |
| 2012/0287556 | A1 | 11/2012 | Silvi et al. |
| 2013/0003227 | A1 | 1/2013 | Lowery et al. |
| 2013/0108852 | A1 | 5/2013 | Kuhlman et al. |
| 2013/0108854 | A1 | 5/2013 | Gallucci et al. |
| 2014/0355173 | A1 | 12/2014 | Odle et al. |

FOREIGN PATENT DOCUMENTS

| | | |
|---|---|---|
| GB | 1458712 | 12/1976 |
| JP | H05169526 A | 7/1993 |
| JP | H05320339 A | 12/1993 |
| JP | H0820060 A | 1/1996 |
| JP | 2008274023 A | 11/2008 |
| JP | 2009141293 A | 6/2009 |
| JP | 2010147329 A | 7/2010 |
| JP | 2001332443 A | 11/2011 |
| WO | 2012155116 A1 | 11/2012 |
| WO | 2014100341 A1 | 6/2014 |
| WO | 2015031627 A1 | 3/2015 |

OTHER PUBLICATIONS

Irwin et al.; "Development of High Temperature Capacitors for High Density, High Temperature Applications"; SAE International Journal of Aerospace, vol. 1, No, 1; Jan. 2009; pp. 817-321.

Resorcinol—LGC; retrieved Nov. 12, 2014, Product Data Sheet, 1 page.

Written Opinion for International Application No. PCT/US2014/040261, Application Filing Date May 30, 2014, dated Oct. 14, 2014, 6 pages.

Zhang, S., et al.; High Dielectric Constant Polymer Film Capacitors, 2010, p. 1-7 (Year: 2010).

* cited by examiner

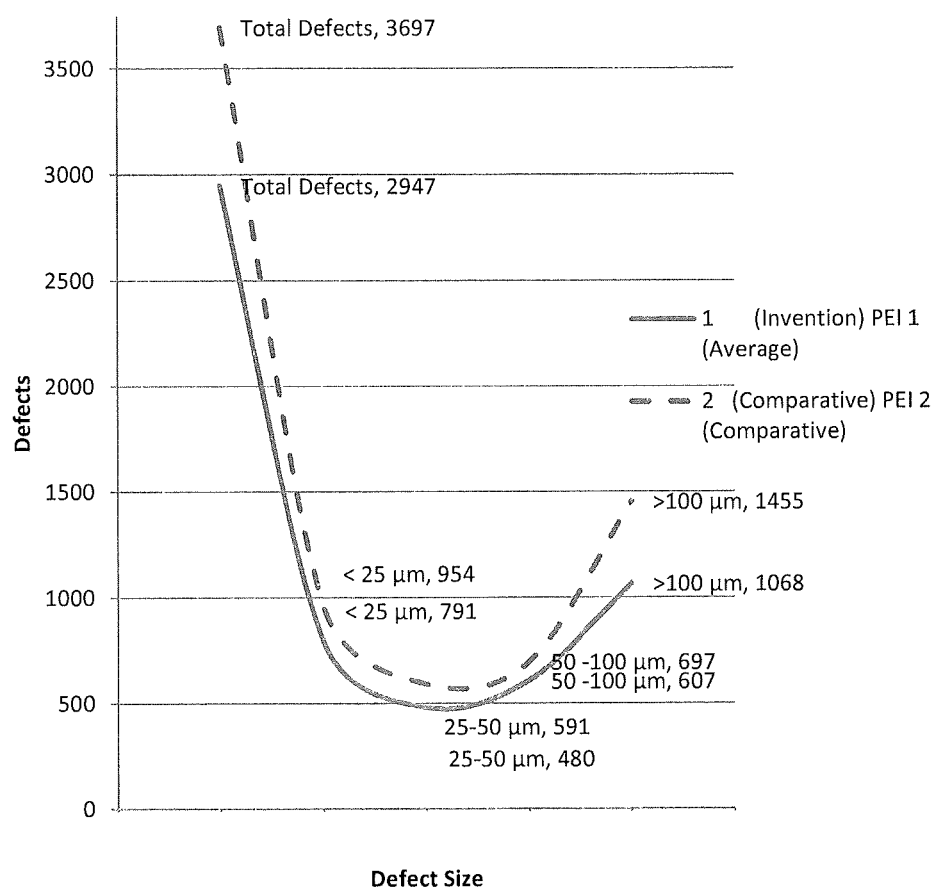

CAPACITOR FILMS, METHODS OF MANUFACTURE, AND ARTICLES MANUFACTURED THEREFROM

CROSS-REFERENCE TO RELATED APPLICATIONS

This application is a continuation-in-part application of U.S. patent application Ser. No. 14/291,989, filed May 30, 2014, which is a continuation of PCT/US2014/040261, filed May 30, 2014, which claims the benefit of U.S. Patent Application No. 61/829,500, filed May 31, 2013, all applications being incorporated by reference in their entirety herein.

BACKGROUND

This disclosure relates to capacitor films, and in particular to polyetherimide capacitor films.

Electrostatic film capacitors with high volumetric energy density, high operating temperature, and long lifetime are critical components for pulse-power, automotive, and industrial electronics. Capacitors are essentially energy-storing devices having two parallel conductive plates separated by a thin layer of an insulating (dielectric) film. When a voltage is applied across the plates, the electric field on the dielectric displaces electric charges, and thus stores energy. The amount of energy stored by a capacitor depends on the dielectric constant of the insulating material and the dimensions (total area and thickness) of the film, such that in order to maximize the total amount of energy that a capacitor can accumulate, the dielectric constant and breakdown voltage of the film are maximized, and the thickness of the film minimized. Because the physical characteristics of the dielectric material in the capacitor are the primary determining factors for the performance of a capacitor, improvements in one or more of the physical properties of the dielectric material in a capacitor can result in corresponding performance improvements in the capacitor component, usually resulting in performance and lifetime enhancements of the electronics system or product in which it is embedded.

Electrostatic film capacitors made from biaxially-oriented poly(propylene) (BOPP) have been used in applications requiring a low dissipation factor, high insulation resistance and low dielectric absorption, such as in electrical appliances, electronic equipment, oven and furnaces, refrigerators, automobiles, and home appliances. The low dielectric constant (Dk), which is about 2.2, and the maximum service temperature of about 100° C. limits the use of these capacitors in applications requiring high operating temperatures and/or high energy densities. Poly(ethylene terephthalate) (PET) and poly(carbonate) (PC) films have a higher dielectric constant than BOPP films (about 3.0), but capacitors made from these films can only be used at operating temperatures as high as about 125° C.

Polyetherimide films manufactured by solvent casting can have a dielectric constant of about 3.2 and operating temperatures as high as about 200° C. The solvent-casting process requires use of solvents that increase the manufacturing cost of the films, as well as films that can have small amounts of solvent entrained therein. To remedy these deficiencies, extrusion has been proposed for the manufacture of polyetherimide films. It has been found, however, that extrusion can be wasteful, where 15 weight percent, 20 weight percent, or even more of the polyetherimide starting material fed to the extruder is not converted to films that are high enough quality for use in capacitors.

There accordingly remains a need in the art for new films and methods for their manufacture that can produce films of very high purity and with excellent electrical properties, in particular high breakdown strength and high dielectric constant. It would be a further advantage if such films could operate at high temperature. There remains a further need for efficient methods for producing such films that are amendable to industrial scale processes. It would be further advantage if such methods were environmentally friendly.

SUMMARY

A polyetherimide film comprises a fluoropolymer and a polyetherimide comprising units derived from polymerization of an aromatic dianhydride with a diamine selected from a meta-phenylene diamine, a para-phenylene diamine, and a combination thereof, wherein the polyetherimide is endcapped with an a substituted or unsubstituted aromatic primary monoamine; and wherein the polyetherimide film comprises at least 90 weight % of the polyetherimide before extrusion.

In a specific embodiment, the polyetherimide has a weight average molecular weight of 20,000 to 400,000 Daltons, as determined by gel permeation chromatography based on a polystyrene standard; and a ratio of viscosity at 100 sec$^{-1}$ and 5,000 sec$^{-1}$ of less than 10 at 340° C. as measured by capillary rheometry; a tensile modulus of greater than or equal to 380,000 psi (2618 MPa) as determined by ASTM D638; and the film has a glass transition temperature of greater than 210° C., or greater than 217° C., a heat distortion temperature of at least 195° C. as measured at 66 psi (0.45 MPa) according to ASTM D648 on a 0.125 inch (3.2 mm) thick test sample, a dielectric constant at 1 kHz, 23° C. and 50% RH of at least 3, a dissipation factor at 1 kHz, 23° C. and 50% RH of 1% or less, a breakdown strength of at least 300 Volts/micrometer measured according to ASTM D-149, and a wrinkle-free region having a variation of the thickness of the film of +/−10% or less of the thickness of the film, and a surface roughness average (Ra) of less than +/−3% of the average thickness of the film as measured by optical profilometry.

Articles comprising the above films are also disclosed, including metallized uniaxially-stretched, extruded films.

Capacitors made from metallized, uniaxially-stretched, extruded films are also disclosed.

Also disclosed is an electronic article comprising the capacitors made from the wound, metallized, polyetherimide film.

BRIEF DESCRIPTION OF THE DRAWINGS

A description of the FIGURE, which is meant to be exemplary and not limiting, is provided in which:

FIG. 1 summarizes the results of the defects for Example 1 and Example 2.

DETAILED DESCRIPTION

The invention is based, in part, on the observation that that polyetherimide substrate films for electrostatic capacitors having excellent properties can be manufactured in a solventless process by extrusion. In a surprising and important feature, films can be efficiently manufactured by extruding certain specific polyetherimide materials, such that the extruded films are high yield, that is, a film made in accordance to our invention comprises at least 90 weight percent of polyetherimide before extrusion (the unextruded polyetherimide that is subjected to extrusion conditions). High yields are achieved by using a polyetherimide comprising units derived from polymerization of an aromatic dianhydride with a diamine selected from a meta-phenylene diamine, a para-phenylene diamine, and a combination thereof, wherein the polyetherimide is endcapped with an a substituted or unsubstituted aromatic primary monoamine. In another surprising feature, films made with polyetherimides having an aromatic primary monoamine substituent exhibit improved dielectric constants as compared to films made from polyetherimides without aromatic primary monoamine substituents.

Various numerical ranges are disclosed in this patent application. Because these ranges are continuous, they include every value between the minimum and maximum values. Unless expressly indicated otherwise, the various numerical ranges specified in this application are approximations. The endpoints of all ranges directed to the same component or property are inclusive of the endpoint and independently combinable.

All molecular weights in this application refer to weight average molecular weights unless indicated otherwise. All such mentioned molecular weights are expressed in Daltons.

The terms "a" and "an" do not denote a limitation of quantity, but rather denote the presence of at least one of the referenced item. As used herein, "combination thereof" is inclusive of one or more of the recited elements, optionally together with a like element not recited. Reference throughout the specification to "an embodiment," "another embodiment," "an embodiment," "some embodiments," and so forth, means that a particular element (e.g., feature, structure, property, and/or characteristic) described in connection with the embodiment is included in at least an embodiment described herein, and may or may not be present in other embodiments. In addition, it is to be understood that the described element(s) can be combined in any suitable manner in the various embodiments.

To determine whether a film is a high yield extruded polyetherimide film comprising at least 90 weight percent (wt. %) of the polyetherimide before extrusion, the number of defects on the film can be counted using an optical inspection system, such as a Schenk Vision on-line scanner utilizing a Smart LINE-CAM 8000HS digital line CCD line scan camera with 8 micron per pixel resolution. The defects (counts) can be classified according to size which range from less than 25 micron to exceeding greater than 100 micron in size.

Films having a total defects counts more than 3000 are classified as films having an extruded polyetherimide film comprising less than 90 wt. % of the polyetherimide before extrusion, while films having total defects under or equal to 3000 defects are classified as films having an extruded polyetherimide film comprising more than 90 wt. % of the polyetherimide before extrusion.

Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group. The term "alkyl" includes both $C_{1-30}$ branched and straight chain, unsaturated aliphatic hydrocarbon groups having the specified number of carbon atoms. Examples of alkyl include, but are not limited to, methyl, ethyl, n-propyl, i-propyl, n-butyl, s-butyl, t-butyl, n-pentyl, s-pentyl, n- and s-hexyl, n- and s-heptyl, and, n- and s-octyl. The term "aryl" means an aromatic moiety containing the specified number of carbon atoms, such as to phenyl, tropone, indanyl, or naphthyl.

The term "alkyl" includes branched or straight chain, unsaturated aliphatic $C_{1-30}$ hydrocarbon groups e.g., methyl, ethyl, n-propyl, i-propyl, n-butyl, s-butyl, t-butyl, n-pentyl, s-pentyl, n- and s-hexyl, n- and s-heptyl, and, n- and s-octyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups.

"Alkylene" means a straight or branched chain, saturated, divalent aliphatic hydrocarbon group (e.g., methylene (—CH$_2$—) or, propylene (—(CH$_2$)$_3$—)).

"Cycloalkylene" means a divalent cyclic alkylene group, —C$_n$H$_{2n-x}$, wherein x represents the number of hydrogens replaced by cyclization(s). "Cycloalkenyl" means a monovalent group having one or more rings and one or more carbon-carbon double bond in the ring, wherein all ring members are carbon (e.g., cyclopentyl and cyclohexyl).

The term "aryl" means an aromatic hydrocarbon group containing the specified number of carbon atoms, such as to phenyl, tropone, indanyl, or naphthyl.

The prefix "halo" means a group or compound including one more of a fluoro, chloro, bromo, iodo, and astatino substituent. A combination of different halo groups (e.g., bromo and fluoro) can be present. In an embodiment, only chloro groups are present.

The prefix "hetero" means that the compound or group includes at least one ring member that is a heteroatom (e.g., 1, 2, or 3 heteroatom(s)), wherein the heteroatom(s) is each independently N, O, S, or P.

"Substituted" means that the compound or group is substituted with at least one (e.g., 1, 2, 3, or 4) substituents independently selected from a $C_{1-9}$ alkoxy, a $C_{1-9}$ haloalkoxy, a nitro (—NO$_2$), a cyano (—CN), a $C_{1-6}$ alkyl sulfonyl (—S(=O)$_2$-alkyl), a $C_{6-12}$ aryl sulfonyl (—S(=O)$_2$-aryl)a thiol (—SH), a thiocyano (—SCN), a tosyl (CH$_3$C$_6$H$_4$SO$_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded.

All ASTM tests are based on the 2003 edition of the Annual Book of ASTM Standards unless otherwise indicated.

The polyetherimides used to manufacture the films comprise more than 1, for example 10 to 1000 or 10 to 500 structural units, of formula (1)

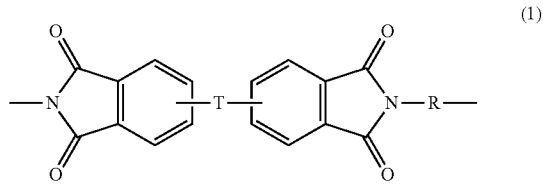

wherein each R is the same or different, and is a group selected from a meta-phenylene, a para-phenylene, or a combination thereof.

Further in formula (1), T is —O— or a group of the formula —O—Z—O— wherein the divalent bonds of the —O— or the —O—Z—O— group are in the 3,3', 3,4', 4,3', or the 4,4' positions. The group Z in —O—Z—O— of formula (1) is also a substituted or unsubstituted divalent organic group, and can be an aromatic $C_{6-24}$ monocyclic or polycyclic moiety optionally substituted with 1 to 6 $C_{1-8}$ alkyl groups, 1 to 8 halogen atoms, or a combination thereof, provided that the valence of Z is not exceeded. Exemplary groups Z include groups derived from a dihydroxy compound of formula (3):

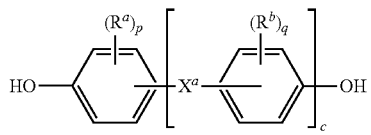

(2)

wherein $R^a$ and $R^b$ can be the same or different and are a halogen atom or a monovalent $C_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formulas (2a)

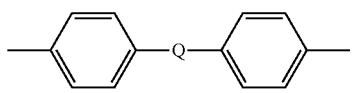

(2a)

wherein Q is —O—, —S—, —C(O)—, —SO$_2$—, —SO—, or —$C_yH_{2y}$— wherein y is an integer from 1 to 5 or a halogenated derivative thereof (including a perfluoroalkylene group). In a specific embodiment Z is derived from bisphenol A wherein Q in formula (2a) is 2,2-isopropylidene.

In an embodiment in formula (1), R is m-phenylene, p-phenylene, or a combination thereof, and T is —O—Z—O wherein Z is a divalent group of formula (2a). Alternatively, R is m-phenylene, p-phenylene, or a combination thereof, and T is —O—Z—O wherein Z is a divalent group of formula (2a) and Q is 2,2-isopropylidene. In some embodiments, R is m-phenylene and T is —O—Z—O wherein Z is a divalent group of formula (2a) and Q is 2,2-isopropylidene. In other embodiments, R is p-phenylene and T is —O—Z—O wherein Z is a divalent group of formula (2a) and Q is 2,2-isopropylidene.

The polyetherimide can be prepared by any of the methods well known to those skilled in the art, including the reaction of an aromatic bis(ether anhydride) of formula (4)

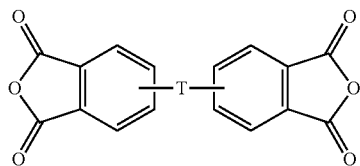

(3)

with m-phenylenediamine, p-phenylenediamine, or a combination thereof, wherein T is as defined in formula (1) above. Copolymers of the polyetherimides can be manufactured using a combination of an aromatic bis(ether anhydride) of formula (3) and a different bis(anhydride), for example a bis(anhydride) wherein T does not contain an ether functionality, for example T is a sulfone.

Illustrative examples of bis(anhydride)s include 3,3-bis [4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride; and, 4-(2,3-dicarboxyphenoxy)-4'-(3,4-dicarboxyphenoxy)diphenyl sulfone dianhydride, as well as various combinations thereof.

Copolymers of the polyetherimides can be manufactured using a combination of an aromatic bis(ether anhydride) of formula (3) and a different diamine, for example ethylenediamine, propylenediamine, trimethylenediamine, diethylenetriamine, triethylene tetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2, 2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1, 3-diamino-4-isopropylbenzene, bis(4-aminophenyl) sulfide, bis-(4-aminophenyl) sulfone, and bis(4-aminophenyl) ether. Combinations of these compounds can also be used. However, in order to achieve the high yields described herein, it is preferred to use a minimal amount of these alternative diamines, for example less than 10 mole %, less than 5 mole %, less than 1 mole %, or none, based on the total moles of diamine used.

Further in order to achieve the desired high yields, the polyetherimides are endcapped with a substituted or unsubstituted aromatic primary monoamine, for example substituted and unsubstituted anilines, substituted and unsubstituted naphthyl primary amines, and substituted and unsubstituted heteroaryl amines, wherein substituents are selected from optionally halogenated $C_{6-12}$ aryl groups, optionally halogenated $C_{1-12}$ alkyl groups, sulfone groups, $C_{1-12}$ ester groups, $C_{1-12}$ amide groups, halogens, $C_{1-12}$ alkyl ether groups, $C_{6-12}$ aryl ether groups or $C_{6-12}$ aryl keto groups bonded to the aromatic ring. The attached functionality should not impede the function of the aromatic primary monoamine to control molecular weight. Suitable monoamine are listed in U.S. Pat. No. 6,919,422. Specific examples include aniline, chloroaniline, perfluoromethylaniline, naphthylamines, and the like. In an embodiment, the aromatic monoamine is aniline.

The amount of aromatic monoamine added during manufacture of the polyetherimide depends on the desired molecular weight and other considerations. For example, the amount of aromatic monoamine present in the imidization reaction can be more than 0 to 10 mole percent (mol. %), specifically 1 to 10 mol. %, alternatively from 2 to 10 mol. %, or from 5 to 9 mol. %, or from 6 to 7 mol. %, based on total moles of aromatic diamine, e.g., phenylene diamine. The monofunctional reactant can be added at any time, e.g., to the aromatic diamine, the aromatic dianhydride, the solvent, or a combination thereof, before or after imidization has started, in the presence or absence of the imidization catalyst. Specific amounts can be determined by routine experimentation.

In an embodiment, the relative amount of each reactant, the type and amount of catalyst, the type and amount of aromatic primary monoamine, and reaction conditions are selected to provide a polyetherimide having from 1.0 to 1.4 molar equivalents of anhydride groups per 1.0 amine groups. Other molar equivalents of anhydride groups per 1.0 amine groups can include from 1.0 to a member selected from the group of 1.002, 1.1, 1.2, 1.3 and 1.4 molar equivalents of anhydride groups per 1.0 amine groups.

The polyetherimide can further optionally be crosslinked. Methods for crosslinking are known, for example irradiating the extruded film at a wavelength and for a time effective to crosslink the polyetherimide. For example, crosslinking can be by ultraviolet irradiation at a wavelength greater than 280 nm and less than or equal to 400 nm.

In an embodiment, the crosslinked polyetherimide exhibits an increase in breakdown strength of 5 to 50% more than the same film comprising an uncrosslinked polyetherimide. In an embodiment, the film is not crosslinked.

Alternatively, or in addition, the film optionally comprises a branched polyetherimide, and wherein the film exhibits a breakdown strength that is from 5 to 50% more than a film that is the same except comprising an unbranched polyetherimide. Methods for forming branched polyetherimides are known in the art. When a branched polyetherimide is used, the film can exhibit a breakdown strength that is from 5 to 50% more than a film that is the same except comprising an unbranched polyetherimide. In an embodiment, the film does not contain a branched polyetherimide.

The polyetherimides can have a melt index of 0.1 to 10 grams per minute (g/min), as measured by American Society for Testing Materials (ASTM) D1238 at 340 to 370° C., using a 6.7 kilogram (kg) weight. In some embodiments, the polyetherimide polymer has a weight average molecular weight (Mw) of 20,000 to 400,000 grams/mole (Dalton), as measured by gel permeation chromatography, using polystyrene standards. In some embodiments the polyetherimide has an Mw of 10,000 to 200,000 Daltons, and particularly good results are obtained with the polyetherimide has an Mw of 10,000 to 80,000 Daltons or 50,000 to 75,000 Daltons. Such polyetherimide polymers typically have an intrinsic viscosity greater than 0.2 deciliters per gram (dl/g), or, more specifically, 0.35 to 0.7 dl/g as measured in m-cresol at 25° C.

The polyetherimides can have a ratio of viscosity at 100 $sec^{-1}$ and 5,000 $sec^{-1}$ of less than 10 at 340° C. as measured by capillary rheometry.

The polyetherimides can have a tensile modulus of greater than or equal to 380,000 psi (2618 MPa) as determined by ASTM D638.

The fluoropolymer in the polyetherimide film can be PFA (perfluoroalkoxy polymers), FEP (fluorinated ethylene propylene polymers), PTFE (polytetrafluoroethylene), PVF (polyvinylfluoride), PVDF (polyvinylidene fluoride), PCTFE (polychlorotrifluoroethylene), ETFE (polyethylenetetrafluoroethylene), ECTFE (polyethylenechlorotrifluoroethylene), perfluoropolyether, or a combination or a copolymer of any one or more of the foregoing.

As used herein, a perfluoroalkoxy polymer is a copolymer of tetrafluoroethylene and a perfluorinated vinyl ether. Specific examples of a perfluoroalkoxy polymer include copolymers of tetrafluoroethylene and perfluoropropyvinyl ether and copolymers of tetrafluoroethylene and perfluoromethylvinyl ether (also referred to as MFA).

The fluoropolymer can be used in an amount from more than 0 to 20 wt. %, or 0.1 to 15 wt. %, or 1 to 10 wt. %, or 5 to 10 wt. %, each based on the total weight of the polyetherimide film.

The inventors hereof have found that in order to manufacture the films in high yield, particularly in roll form as described below, and having the desired electrical and other characteristics the polyetherimide film-forming compositions (and thus the films) comprise low levels of various side products and contaminants as described below.

For example, the polyetherimide film-forming compositions or the films can comprise 0 to 2 wt. %, or 0 to 1 wt. %, or 1 to 0.5 wt. % of a phosphorus-containing stabilizer having a molecular weight greater than or equal to 500 grams/mole, based on the weight of the polyetherimide film-forming compositions or the films.

The polyetherimide film-forming compositions or the films can comprise 0 or 0.1 to less than 50 ppm, less than 40 ppm, less than 30 ppm, or less than 20 ppm of a hydroxyl group-containing compound, based on the parts by weight of the polyetherimide film-forming compositions or the films.

The polyetherimide film-forming compositions or the films can comprise 0 or 0.1 to less than 10 ppm, less than 8 ppm, less than 5 ppm, or less than 3 ppm each of phthalic anhydride phenylene diamine or phthalic anhydride phenylene diamine imide, based on the parts by weight of the polyetherimide film-forming compositions or the films. Alternatively, or in addition, the polyetherimide film-forming compositions or the films can comprise 0 or 0.1 to less than 10 ppm, less than 8 ppm, less than 5 ppm, or less than 3 ppm total of phthalic anhydride phenylene diamine or phthalic anhydride phenylene diamine imide, based on the parts by weight of the polyetherimide film-forming compositions or the films.

The polyetherimide film-forming compositions or the films can comprise 0 or 0.1 to less than 5 wt. %, less than 4 wt. %, less than 3 wt. %, or less than 2 wt. % of a compound having a molecular weight of less than 500 Daltons, based on the weight of the polyetherimide film-forming compositions or the films.

The polyetherimide film-forming compositions or the films can comprise 0 or 0.1 to less than 1500 ppm, less than 1200 ppm, less than 1000 ppm, less than 800 ppm, or less than 500 ppm of a halogen-containing compound, based on the parts by weight of the polyetherimide film-forming compositions or the films.

The polyetherimide film-forming compositions or the films can comprise 0 or 0.1 to less than 100 ppm, less than 80 ppm, less than 60 ppm, less than 40 ppm, or less than 20 ppm of an alkali metal, based on the parts by weight of the polyetherimide film-forming compositions or the films.

The polyetherimide film-forming compositions or the films can comprise 0 to less than 0.1 ppm each of leachable low ionic chlorides and sulfates, based on the parts by weight of the polyetherimide film-forming compositions or the films.

The polyetherimide film-forming compositions or the films can comprise 0 or 0.1 to less than 10 ppm, less than 9 ppm, less than 8 ppm, less than 7 ppm, less than 6 ppm, or less than 5 ppm each of metal contaminants selected from Al, Ca, Cr, Fe, K, Mg, Na, Ni, and Ti, based on the parts by weight of the polyetherimide film-forming compositions or the films. Alternatively, or in addition, the total amount of the metal contaminants in the film can be 0 or 0.1 to less than 20 ppm, less than 15 ppm, less than 10 ppm, or less than 5 ppm.

In some embodiments, the polyetherimide film-forming compositions or the films can contain 0 or 0.1 to less than 5 wt. % of fluorine, specifically less than 4 wt. %, less than 3 wt. %, less than 2 wt. %, less than 1 wt. %, each based on the total weight of the composition. The presence of fluorine can decrease the dielectric breakdown strength of the polymer and the corresponding film made from the polymer.

Thus, in these embodiments the polyetherimide film-forming compositions or films can contain 0 or 0.1 to less than 1000 ppm, specifically less than 750 ppm, less than 500 ppm, or less than 50 ppm by weight of a fluorine-containing compound, based on the parts by weight of the polyetherimide film-forming compositions or the films. In an embodiment, no fluorine-containing compound is present in the film-forming composition. Such compounds include, without limitation, certain mold release agents, fillers (e.g., particulate PTFE), or flame retardants.

In other embodiments, the polyetherimide film-forming compositions or the films can contain fluorine, for example fluorine in an amount of more than 0 to 12 wt. %, for example 100 ppm to 10 wt. % of fluorine, or 500 ppm to 8 wt. % of fluorine, or 0.1 to 7 wt. % of fluorine, or 0.25 to 6 wt. % of fluorine, or 0.5 to 5 wt. % of fluorine, each based on the total weight of the composition.

Other polymer components can be present in the polyetherimide film-forming compositions and thus the films, provided that the desired high yields or physical and electrical properties are not significantly adversely affected. For example, the polyetherimide film-forming compositions or the films can comprise 1 to 50 wt. %, 1 to 40 wt. %, 1 to 30 wt. %, 1 to 20 wt. %, or 1 to 10 wt. % of a polymer selected from a silicone polyetherimide, a polyetherimide sulfone, a polyester, a polycarbonate, a silicone polycarbonate-polyester copolymer, and a combination thereof, based on the weight of the polyetherimide film-forming compositions or the films. Alternatively, the polyetherimide film-forming compositions or the films can comprise 0 or 0.1 to less than 20 wt. %, less than 15 wt. %, less than 10 wt. %, or less than 5 wt. % of any other polymer, in particular any other polymer selected from a silicone polyetherimide, a polyetherimide sulfone, a polyester, a polycarbonate, a silicone polycarbonate-polyester copolymer and a combination thereof, based on the weight of the polyetherimide film-forming compositions or the films.

The polyetherimide film-forming compositions or the films can comprise 0 or 0.1 to less than 15 wt. %, less than 12 wt. %, less than 10 wt. %, less than 8 wt. %, or less than 5 wt. % of a polyetherimide other than the polyetherimide comprising units derived from polymerization of an amine selected from meta-phenylene diamines, para-phenylene diamines, and combinations thereof, based on the weight of the polyetherimide film-forming compositions or the films.

The polyetherimide or the films can have a single glass transition temperature greater than 150° C., greater than 160° C., or greater than 180° C.

The polyetherimide films can comprise comprises fewer than two, or fewer than one carbonized inclusions having a diameter greater than 20 micrometers in an area of 100 cm$^2$. Also, polyetherimide films can comprise comprises fewer than two, or fewer than one gel area having a diameter greater than 20 micrometers in an area of 100 cm$^2$.

Similarly it has been found that in order to produce the wrinkle-free films, particularly in roll form as described below, the polyetherimide film-forming compositions (and thus the films) contain less than 1000 ppm, specifically less than 750 ppm, less than 500 ppm, or less than 50 ppm by weight of a silicone compound. In an embodiment, no silicone compound is present in the film-forming composition or film. Such silicone compounds include, without limitation, silicone oils, and polydimethyl siloxanes. Optionally, a fluorine-containing compound can be present in these embodiments.

However, in other embodiments, the polyetherimide film-forming compositions and films can contain less than 1000 ppm, specifically less than 750 ppm, less than 500 ppm, or less than 50 ppm by weight of both a fluorine-containing compound and a silicone compound. In an embodiment, no fluorine-containing compound and no silicone compound is present in the film-forming compositions or films.

In some embodiments it is desired to use polyetherimide film-forming compositions and films that are essentially free of bromine and chlorine. "Essentially free" of bromine and chlorine means that the composition has less than 3 wt. % of bromine and chlorine, and in other embodiment less than 1 wt. % bromine and chlorine by weight of the film-forming composition. In other embodiments, the composition is halogen free. "Halogen free" is defined as having a halogen content (total amount of fluorine, bromine, chlorine, and iodine) of less than or equal to 1000 parts by weight of halogen per million parts by weight of the total composition (ppm). The amount of halogen can be determined by ordinary chemical analysis such as atomic absorption.

Also, since the films are extruded and not made from solvent casting processes, the extruded films of our inventions can be "solvent free." "Solvent free" means that the films have less than 1000 ppm of a solvent. In one embodiment, the films have less than 500 ppm of a solvent or less than 400 ppm or less than 300 ppm or less than 200 ppm or less than 100 ppm or less than 10 ppm. In one embodiment, the films do not have any detectable amounts of a solvent. Examples of such solvents include and are not limited to ortho-cresol, meta-cresol, dimethyl acetamide (DMAC), N-methyl pyrrolidone (NMP), dimethyl formamide (DMF), chlorobenzene, ortho-dichlorobenzene, tricholorobenzene, veratrole, anisol, and combinations thereof.

The polyetherimide film-forming compositions can optionally further comprise or exclude one or more particulate fillers to adjust the properties thereof, for example dielectric constant, coefficient of thermal expansion, and the like. Exemplary particulate fillers include silica powder, such as fused silica and crystalline silica; boron-nitride powder and boron-silicate powders; alumina, and magnesium oxide (or magnesia); silicate spheres; flue dust; cenospheres; aluminosilicate (atmospheres); natural silica sand; quartz; quartzite; titanium oxide, barium titanate, barium strontium, tantalum pentoxide, tripoli; diatomaceous earth; synthetic silica; and combinations thereof. All of the above fillers can be surface treated with silanes to improve adhesion and dispersion with the polymeric matrix resin. When present, the amount of particulate filler in the polyetherimide film-forming compositions can vary widely, and is that amount effective to provide the desired physical properties. In some instances the particulate filler is present in an amount from 0.1 to 50 vol. %, 0.1 to 40 vol. %, alternatively 5 to 30 vol. %, more particularly 5 to 20 vol. %, each based on the total weight of the film-forming composition.

The polyetherimide film-forming compositions can include or exclude various additives incorporated into dielectric substrate polymer compositions, with the proviso that in some embodiments the additives are selected so as to not provide more than 5 wt. % of fluorine, or in some embodiments, no more than 1000 ppm by weight of a silicone compound, or both, or otherwise do not significantly adversely affect the desired properties of the compositions. In an embodiment, any additives are present in an amount that provides less than 1,000 ppm of a compound having a molecular weight of less than 250 Daltons. Exemplary additives include antioxidants, thermal stabilizers, light stabilizers, ultraviolet light (UV) absorbing additives, quenchers, plasticizers, lubricants, antistatic agents, flame retardants, anti-drip agents, and radiation stabilizers. Combinations of additives can be used. The foregoing additives (except any fillers) are generally present individually in an amount from 0.005 to 20 wt. %, specifically 0.01 to 10 wt. %, based on the total weight of the film-forming composition.

Suitable antioxidants can be compounds such as phosphites, phosphonites, and hindered phenols or mixtures thereof. Phosphorus-containing stabilizers including triaryl phosphites and aryl phosphonates are useful additives. Difunctional phosphorus containing compounds can also be unseeded. Preferred stabilizers can have a molecular weight greater than or equal to 300. Some exemplary compounds are tris-di-tert-butylphenyl phosphite available from Ciba Chemical Co. as IRGAPHOS 168 and bis (2,4-dicumylphenyl) pentaerythritol diphosphite available commercially from Dover Chemical Co. as DOVERPHOS S-9228.

Examples of phosphites and phosphonites include: triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxy pentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butyl-phenyl) 4,4'-biphenylene diphosphonite, bis(2,4-di-tert-butyl-6-methylphenyl) methyl phosphite, bis(2,4-di-tert-butyl-6-methylphenyl) ethyl phosphite, 2,2',2"-nitrilo[triethyl tris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite and 5-butyl-5-ethyl-2-(2,4,6-tri-tert-butyl-phenoxy)-1,3,2-dioxaphosphirane.

Combinations comprising more than one organophosphorous compound are contemplated. When used in combination the organophosphorous compounds can be of the same type or different types. For example, a combination can comprise two phosphite or a combination can comprise a phosphite and a phosphonite. In some embodiments, phosphorus-containing stabilizers with a molecular weight greater than or equal to 300 are useful. Phosphorus-containing stabilizers, for example an aryl phosphite are usually present in the composition in an amount from 0.005 to 3 wt. %, specifically 0.01 to 1.0 wt. %, based on total weight of the composition.

Hindered phenols can also be used as antioxidants, for example alkylated monophenols, and alkylated bisphenols or poly phenols. Exemplary alkylated monophenols include 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4-isobutylphenol; 2,6-dicyclopentyl-4-methylphenol; 2-(alpha-methylcyclohexyl)-4,6-dimethylphenol; 2,6-dioctadecyl-4-methylphenol; 2,4,6-tricyclohexylphenol; 2,6-di-tert-butyl-4-methoxymethylphenol; nonyl phenols which are linear or branched in the side chains, for example, 2,6-di-nonyl-4-methylphenol; 2,4-dimethyl-6-(1'-methylundec-1'-yl)phenol; 2,4-dimethyl-6-(1'-methylheptadec-1'-yl)phenol; 2,4-dimethyl-6-(1'-methyltridec-1'-yl)phenol and mixtures thereof. Exemplary alkylidene bisphenols include 2,2'-methylenebis(6-tert-butyl-4-methylphenol), 2,2'-methylenebis(6-tert-butyl-4-ethylphenol), 2,2'-methylenebis[4-methyl-6-(alpha-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(alpha-methylbenzyl)-4-nonylphenol], 2,2'-methylenebis[6-(alpha, alpha-dimethylbenzyl)-4-nonylphenol], 4,4'-methylenebis-(2,6-di-tert-butylphenol), 4,4'-methylenebis (6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane and mixtures thereof.

The hindered phenol compound can have a molecular weight of greater than or equal to 300 g/mole. The high molecular weight can help retain the hindered phenol moiety in the polymer melt at high processing temperatures, for example greater than or equal to 300° C. Hindered phenol stabilizers, are usually present in the composition in an amount from 0.005 to 2 wt. %, specifically 0.01 to 1.0 wt. %, based on total weight of the composition.

In some embodiments, the polyetherimide film-forming compositions can further optionally include at least one additional amorphous polymer, again with the proviso that in some embodiments the polymers are selected so as to not provide more than 5 wt. % of fluorine or silicon, or in other embodiments not more than 1000 ppm of a silicone compound, or otherwise not significantly adversely affect the desired properties of the compositions. Examples of such additional polymers include and are not limited to poly (phenylene sulfone)s, poly(sulfone)s, poly(ether sulfone)s, poly(arylene sulfone), poly(phenylene ether)s, polycarbonates (polycarbonate homopolymers, polycarbonate copolymers, e.g. polyestercarbonate copolymers) as well as blends and co-polymers thereof. When present, the polymer is used in an amount from more than 0 to 12 wt. %, specifically 0.1 to 10 wt. %, more specifically from 0.5 to 5 wt. %, all based on the total weight of the composition. In an embodiment, no polymer other than the polyetherimide is present in the film-forming composition. In another embodiment a fluoropolymer is present in the film-forming composition.

The polyetherimide film-forming compositions can be prepared by blending the ingredients under conditions for the formation of an intimate blend. Such conditions often include melt mixing in single or twin screw type extruders, mixing bowl, or similar mixing devices that can apply a shear to the components. Twin-screw extruders are often preferred due to their more intensive mixing capability and self-wiping capability, over single screw extruders. It is often advantageous to apply a vacuum to the blend through at least one vent port in the extruder to remove volatile impurities in the composition. Often it is advantageous to dry the polyetherimide (and/or other additives) prior to melting. The melt processing is often done at 290° C. to 340° C. to avoid excessive polymer degradation while still allowing sufficient melting to get an intimate polymer mixture free of any unbelted components. The polymer blend can also be melt filtered using a 40 to 100 micrometer candle or screen filter to remove undesirable black specks or other heterogeneous contaminants, for example any particles having a diameter of greater than 1 micrometer.

In an exemplary process, the various components are placed into an extrusion compounder to produce a continuous strand that is cooled and then chopped into pellets. In another procedure, the components are mixed by dry blending, and then fluxed on a mill and comminuted, or extruded and chopped. The composition and any optional components can also be mixed and directly extruded to form a film. In an embodiment, all of the components are freed from as much water as possible. In addition, compounding is carried out to ensure that the residence time in the machine is short, the temperature is carefully controlled, the friction heat is utilized, and an intimate blend between the components is obtained.

The composition can be extruded using extruders conventionally used for thermoplastic compositions using a flat die. The extrusion cast film method involves the melting of the polymer in an extruder, conveying of the molten polymer through a flat die of small lip gap separation, the stretching of the film at relatively high take-up speeds, and the cooling/solidification of the polymer to form the final film. The extruder may be of the single- or twin-screw design, and a melt pump may also be used to provide a constant, non-pulsating flow of polymer through the die. The die lip gap may be as small as 100 to 200 micron, and the take-up rollers may operate at speeds of up to 200 m/min. The design may also include the addition of a heated roll to temper/anneal the film and thus minimize the occurrence of frozen-in internal stresses. The edges of the film are often trimmed, and the film wound up on a roll using a tension-controlled winding mechanism. In some instances, commercial and/or experimentally functionalized fillers can be uniformly dispersed in the polymer prior to stretching the composite material into a thin film. In these cases, the compounding of the filler into the polymeric matrix to obtain a uniform dispersion can be done on a separate extruder or alternatively, and more preferably, on the same extruder used to effect the melting of the polymer prior to the stretching operation. The accuracy of delivering a constant and uniform flow of molten polymer through the die, the rheological properties of the polymer used to make the film, the cleanliness of both resin and equipment, and the mechanical characteristics of the take-up mechanism will all contribute to the successful preparation of these extruded films having relatively small thicknesses.

In an embodiment, the extrusion cast film method is one-step, scalable to larger size equipment, and does not require the use of any solvent. Even for the case of polymers of high molecular weight and/or high glass transition temperature, this extrusion process can be properly designed to provide an environment for the polymer that does not lead to excessive temperatures that can cause the thermal or mechanical degradation of the material. The use of a filtration device for the melt produces a film that is virtually free of contaminants, such as gels and black specks, which would damage the dielectric performance of these films if not properly removed from the melt. The films produced by this method are thin (10 micron in thickness, and even thinner), of uniform thickness across the web, flat with almost no wrinkles or surface waviness, and relatively free of contamination.

The melted composition can be conveyed through the extruder die using a melt pump. In an embodiment, the film is extruded at temperatures from 250° C. to 500° C., for example 300° C. to 450° C., and the extruded film is uniaxially stretched to produce the dielectric substrate film. Specifically, the components of the film-forming composition are combined, melted, and intimately mixed, then filtered to remove particles greater than 1 micrometer; extruded through a flat die at the foregoing temperatures; and then uniaxially stretched. After stretching, the film can be directly metallized as described below, or wound on a takeup roll for storage or shipping. The film can have a length of at least 10, or 100 to 10,000 meters, and a width of at least 300, or 300 to 3,000 millimeters. The rate at which the film can be extruded can vary. In commercial embodiments, the rate at which the film can be extruded ranges from 10 lbs (4.5 kg/hr) to 1000 lbs/hr (500 kg/hr). The rate at which the film can pulled from the die plate of the extruder (the takeup speed) can range from 10 meters/minute to 300 meters/minute.

In an important feature, use of the polyetherimide-film-forming compositions as described above results in high yield extruded films, that is, films wherein the extruded film comprises at least 90 wt. %, at least 92 wt. %, at least 94 wt. %, at least 96 wt. %, or at least 98 wt. % of the polyetherimide before extrusion.

The films can be metallized on at least one side thereof. A variety of metals can be used depending on the intended use of the film, for example copper, aluminum, silver, gold, nickel, zinc, titanium, chromium, vanadium, tantalum, niobium, brass, and others. The films are metallized at least on the smooth side, that is, the side having an Ra of less than +/−3% as determined by optical profilometry. Methods for the metallization of polymer films are known, and include, for example, vacuum metal vapor deposition, metal sputtering, plasma treatments, electron beam treatments, chemical oxidation or reduction reactions, as well as electroless wet-chemical deposition. The films can be metallized on both sides by conventional electroless plating. In another embodiment, a patterned metal layer can be formed on a surface of the film, for example by ink jet printing. The thickness of the metallized layer is determined by the intended use of the metallized film, and can be, for example, 1 Angstrom to 1000 nanometers, 500 nanometer, or 10 nanometer. In an embodiment, the thickness of the metal film can be 1 to 3000 Angstrom, 1 to 2820 Angstrom, 1 to 2000 Angstrom, or 1 to 1000 Angstrom. If a conductive metal is used, the resistivity of the metal layer on the polymer film can be from 0.1 to 1000 Ohms per square, or 0.1 to 100 Ohms per square.

The surface of the film to be metallized can be pre-treated, for example by washing, flame treatment, plasma discharge, corona discharge, or the like, for example to enhance adhesion of the metal layer. One or more additional layers can be deposited on the metal layer, for example a clear coat (such as a poly(methyl methacrylate) or poly(ethyl methacrylate) to provide scratch resistance), or another layer of the polyetherimide film to form a laminate.

The films and metallized films thus produced have a variety of advantageous physical properties.

For example, the films and metallized films can have a glass transition temperature of greater than 210° C., greater than 215° C., greater than 217° C., greater than 220° C., or greater than 225° C.

The films and metallized films can have a heat distortion temperature of at least 195° C., at least 198° C., at least 200° C., or at least 205° C. as measured at 66 psi (0.45 MPa) according to ASTM D648 on a 0.125 inch (3.2 mm) thick test sample.

The films and metallized films can have a dissipation factor, as measured by dielectric spectroscopy, at 1 kHz, 23° C. and 50% RH ranging from more than 0 and less than 5%, more than 0 and less than 4%, more than 0 and less than 3%, more than 0 and less than 2%, or more than 0 and less than 1%. In an embodiment, the films have a low dissipation factor, that is, less than 0.1%, or less than 0.08%. In an embodiment, the dissipation factor at 1 kHz remains essentially unchanged from 0 to 175° C., and is less than 1.3%. In another embodiment, the dissipation factor is 0 to less than 1.3%, or less than 1.0% from 1 kHz to 100 kHz at 23° C. and 50% RH.

The composition and manufacturing method can be varied to achieve the desired performance properties, in particular electrical properties.

The films and metallized films can have a high dielectric constant at 1 kHz, 23° C. and 50% RH, in particular greater than 2.7, greater than 3.0, or greater than 3.2, 3.3, 3.4, 4.2, 4.3, 4.4, or 4.5, up to 7.0.

The films and metallized films further can have a dielectric constant that is stable up to the Tg of the polymer that they are made from. Generally, the films are used in environments at a temperature that is lower than the Tg of the polyetherimide, e.g. approximately 20° C. lower. In an embodiment, the dielectric constant of the films at 1 kHz remains essentially unchanged from 0 to 175° C. with a difference of less than 20%, less than 10%, or less than 5% of the highest dielectric constant value.

The films and metallized films can have at least one region that is wrinkle-free, that is, sufficiently flat and smooth so that when a surface thereof is metallized, the metallized film has an advantageously consistent surface morphology.

In addition, the films and metallized films have large wrinkle-free regions. The wrinkle-free regions are sufficiently smooth and flat such that the substrate film can be metallized to provide a metallized film having a breakdown strength of at least 300 Volts/micrometer. The wrinkle-free regions are sufficiently smooth and flat such that the substrate film can be metallized to provide a metallized film of substantially uniform breakdown strength across the region.

In particular, the or wrinkle-free regions have a thickness of more than 0 to less than 50 micrometers, less than 40 micrometers, less than 30 micrometers, less than 20 micrometers, or less than 15 micrometers. For example, the film can have a thickness of more than 0 to 13 micrometers. In an embodiment, any variation of the thickness of the film is +/−10% of the thickness of the film, and the surface roughness of the film is less than 3% of the average thickness of the film. The films provide both an increase in the capacitor dielectric constant and dielectric breakdown strength compared to prior art films, while retaining other advantageous physical and electrical characteristics, such as flexibility, thinness, and dielectric constant stability. For example, the films can have a high voltage breakdown strength (at least 300 Volts/micrometer), a high dielectric constant (greater than 2.7) and a low dissipation factor (less than 1%). The films further can have a dielectric constant that is stable up to 150° C. The films and capacitors made from the films accordingly offer advantages over current materials and methods for the manufacture of components for the electronics industry. A particular advantage is that the films can be reliably manufactured on industrial scale in a solventless process. Removal of solvent from solvent-case films can be difficult. The extruded films herein are processed without solvent, providing both a cost and a manufacturing advantage, as well as being more environmentally friendly. In another embodiment, the extruded films are more than 0 and less than or equal to 7 microns.

In an embodiment, the breakdown strength of the un-metallized film is at least 300 Volts/micrometer, alternatively at least 350 Volts/micrometer, alternatively at least 400 Volts/micrometer. In an embodiment, the breakdown strength of the un-metallized film can be up to 520, 530, 540, 550, 560, 570, 580, 590, 600, 610, 620, 630, 640, and 650 Volt/micrometer.

The flatness of the wrinkle-free regions of the films can be determined by measuring the variation in thickness of the film over a specific area. Here, flat films have a variation of the thickness of the film of plus or minus (+/−) 10% or less, alternatively +/−9% or less, +/−8% or less, +/−6% or less, or +/−5%, +/−4%, +/−3%, +/−2%, +/−1% or less, based on the average thickness of the film over the measured area. In an embodiment, the variation in thickness can be as low as +/−1%%.

The smoothness of the wrinkle-free regions of a surface of the films can be quantitated by measuring the surface roughness average ("Ra") of the surface by optical profilometry. Here, the wrinkle-free regions of the films have a surface having an Ra of less than +/−3%, less than /−2%, or a low as +/−1% of the average thickness of the film as measured by optical profilometry.

In a particularly advantageous feature, the wrinkle-free regions can be produced over a large area of the film. For example, at least 80%, at least 85%, at least 90%, at least 95%, or at least 97% of area of the film can be wrinkle-free. In another embodiment, the wrinkle-free region can have a contiguous area of at least 1 square meter ($m^2$), at least 2 $m^2$, at least 3 $m^2$, at least 5 $m^2$, at least 10 $m^2$, at least 20 $m^2$, at least 50 $m^2$, or at least 100 $m^2$. The large size of the wrinkle-free regions offers a significant manufacturing advantage, in that the metallized films can be manufactured, stored, and shipped in roll form. Thus, the film can have a length of at least 10 meters, and a width of at least 300 millimeters, wherein at least 80%, at least 85%, at least 90%, at least 95%, or at least 97% of area of the film is the wrinkle-free region. In another embodiment, the film has a length of 100 to 10,000 meters, and a width of 300 to 3,000 millimeters, wherein at least 80%, at least 85%, at least 90%, at least 95%, or at least 97% of area of the film is the wrinkle-free region.

The films and the metallized films can have a dynamic and static coefficient of friction on steel, on a metallized surface, and on itself of less than 0.75 measured according to ASTM D1894.

The films and the metallized films can have a surface resistivity greater than 1E13 Ohm per square measured according to ASTM D257.

The films and metallized films can have a breakdown strength difference of from 0 to 175° C. is less than 40% from the value at 23° C., measured according to ASTM D149.

The films and metallized films can have a difference in capacitance at 1 kHz of less than +/−5%, or less than +/−3%, from 0 to 175° C. based on the value at 23° C.

The films and the metallized films can be essentially solvent-free, that is, contain less than 1,000 ppm, less than 750 ppm, less than 500 ppm, or less than 250 ppm of a compound having a molecular weight of less than 250 Daltons.

The films and the metallized films can have no observable specks or gels over an area of at least 3 square meters, or over an area of at least 9 square meters when viewed at a distance of 0.3 meters without magnification.

The films and the metallized films can have no observable voids over an area of at least 3 square meters, or over an area of at least 9 square meters when viewed at a magnification of 50×.

The polyetherimide films can be used in any amorphous film application, but are particularly suitable for metallization. The metallized films can be used in any metallized film application, but are particularly suitable for electrical applications, for example as capacitors or circuit materials. High energy density, high voltage non-polar capacitors can be made using a metalized polymer film that is wound into a cylindrical shape. In a specific embodiment, the polyetherimide film is extruded, then metallized by spraying a conductive metal such as copper or aluminum onto the moving polymer film via vapor deposition in a vacuum chamber, to a thickness from 1 Angstrom to 1000 nanometers, 1 to 3000 Angstrom, or 1 to 1000 Angstrom. The resistivity of the metal on the polymer film can be in a range from about 0.1 Ohm per square to 100 Ohm per square. Before the metallization process is performed, the polymer film can be appropriately masked to provide unmetallized margins at the edges of the width of the film, so that alternate layers of metallized film (when the capacitor is assembled) have unmetallized regions at opposite edges to prevent electrical shorting of the electrodes of the capacitor when the end metallization is ultimately applied.

The capacitors can then be fabricated by rolling two stacked metalized polymer films into a tubular shape. Electrical wires are connected to each metal layer. In a specific embodiment, two separate rolls of the metallized film are placed in a capacitor winder and wound tightly together on a mandrel (which may subsequently be removed) so that the layers are arranged in the sequence polyetherimide/metallized layer/polyetherimide/metallized layer, to replicate a typical construction of a capacitor, i.e., a dielectric with two metallic layers on opposite sides. The two rolls of film are wound with the unmetallized margins on opposite sides.

The extent of winding of the capacitor depends on the physical size of the capacitor desired or on the capacitance desired. Tight winding of the two rolls aids in removing any entrapped air that might otherwise cause premature breakdown. Individual capacitors can be processed in a clean room environment of at least class 100, incorporating HEPA filters, to reduce the likelihood of contamination of the contact point between the dielectric film layers by foreign particles as well as reducing moisture intake in the dielectric. Electric winding can be used to better maintain uniform tension on each capacitor. The capacitor can then be taped at the edges thereof and strapped in a tray open on both sides, to prevent unwinding of the film layers and to allow the edges or ends of the cylinder to be sprayed with a conductive element, for example with a high zinc content solder followed by a regular softer end spray solder of 90% tin, 10% zinc. The first spray scratches the metallized surface and creates a trough to achieve better contact with the metallization on the dielectric film. The combination of end sprays further aids better contact adhesion with the final termination. Subsequently, conductive, e.g., aluminum leads can then be soldered onto each end to form the final termination. One termination can be spot welded to the bottom of the can, while the other termination can be parallel welded to the lid. The capacitor is filled with a liquid impregnate (for example, isopropyl phenyl sulfone), in vacuum filling apparatus, and closed.

In another embodiment, the invention relates to an electronic article comprising the capacitors made from wound metallized uniaxially-stretched extruded film.

Other capacitor configurations are possible. For example, the capacitor can have a flat configuration comprising at least a first and a second electrode disposed in a stacked configuration; and the polyetherimide film disposed between and in at least partial contact with each of the first and second electrodes. Additional polyetherimide films and electrode layers can be present in alternating layers. Thus, a multilayer article for forming an electronic device is within the scope of the present claims, comprising a polyetherimide layer/metal layer/dielectric layer, wherein the dielectric layer can be a polyetherimide film as described herein, or other dielectric material. Additional layers (e.g., additional alternating dielectric/metal layers) can optionally be present.

The following examples are included to provide additional guidance to those skilled in the art of practicing the claims. Accordingly, these examples are not intended to limit the invention in any manner.

All patents and references cited herein are incorporated by reference. All parts and percentages are by weight unless otherwise indicated.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

EXAMPLES

Examples 1-4

Example 1

Purpose: The purpose of this example was to evaluate the yield of a polyetherimide (PEI 1) in making a uniaxially-stretched, high yield extruded polyetherimide film that was an extruded polyetherimide comprising units derived from polymerization of an aromatic dianhydride with a diamine selected from a meta-phenylene diamine, such that the polyetherimide was endcapped with a primary monoamine (aniline).

Example 2

Purpose: The purpose of this example was to evaluate the yield of a polyetherimide (PEI 2) in making a uniaxially-stretched, high yield extruded polyetherimide film that was an extruded polyetherimide comprising units derived from polymerization of an aromatic dianhydride with a diamine selected from a meta-phenylene diamine, such that the polyetherimide was not endcapped with an a substituted aromatic primary monoamine (aniline).

Example 3

Purpose: The purpose of this example is to evaluate the yield of a polyetherimide (PEI 4) in making a uniaxially-stretched, high yield extruded polyetherimide film that was an extruded polyetherimide comprising units derived from polymerization of an aromatic dianhydride with a diamine selected from a para-phenylene diamine, such that the polyetherimide was not endcapped with an a substituted aromatic primary monoamine (aniline).

Example 4

Purpose: The purpose of this example is to show evaluate the yield of a polyetherimide (PEI 3) in making a uniaxially-stretched, high yield extruded polyetherimide film that was an extruded polyetherimide comprising units derived from polymerization of an aromatic dianhydride with a diamine selected from a para-phenylene diamine, such that the polyetherimide was endcapped with an a substituted aromatic primary monoamine (aniline).

Materials

The following materials were used to make the polyetherimide films that were tested:

TABLE 1

Material Description

| Name | Material | Description |
| --- | --- | --- |
| PEI 1 (Invention) | Polyetherimide that is endcapped with an aromatic primary monoamine | Polyetherimide that is aniline endcapped and using meta-phenylene diamine |
| PEI 2 (Comparative) | Control Polyetherimide (Polyetherimide that is not endcapped with an aromatic primary monoamine). | Polyetherimide that is endcapped with phthalic anhydride and using meta-phenylene diamine |
| PEI 3 (Comparative) | Control Polyetherimide (A chemically resistant Polyetherimide that is not endcapped with an aromatic primary monoamine). | Polyetherimide that is endcapped with phthalic anhydride and using para-phenylene diamine |
| PEI 4 (Invention) | A chemically resistant Polyetherimide that is endcapped with an aromatic primary monoamine | Polyetherimide that is endcapped with aniline and using para-phenylene diamine |

Techniques and Procedures

The following paragraph describes how the properties for materials used in these examples were determined. A 180-ton injection-molding machine with a 5.25 oz. barrel was used to mold ASTM samples for tensile and heat deflection temperature (HDT) testing for comparison prior to conversion to a thin film. The materials were molded with a melt temperature of 380° C. after 8 hours of drying in a dehumidifying dryer at 150° C. to a moisture level less than 0.02 wt. %. An oil-thermolator was used to control the mold surface temperature to 150° C. Screw rotation ranged from 60-80 rpm with 0.3 MPa back pressure without screw decompression after screw recovery. A typical cycle time of 32-35 seconds resulted and was dependent on the ASTM test specimen molded. Tensile properties were evaluated using a ASTM D 638 standard test method with a Type I test specimen and rate of 0.2 inch/min, while heat deflection temperature used ASTM D 648 with 264 psi (1.8 MPa) and 0.250 inch (6.4 mm) unannealed test sample. In addition, pellets of each material were used to measure rheological properties of melt flow rate by ASTM D1238 at 337° C. and 6.6 kgf and capillary rheometry to measure shear viscosity at 340° C. Glass transition temperature (Tg) was measured using Differential Scanning calorimetry (DSC) at a heating rate of 20° C./min to 300° C. with result reported on the second scan. Table 2 indicates the properties that were determined.

TABLE 2

| Material Properties | | | | |
|---|---|---|---|---|
| | PA endcapped mPD PEI PEI 2 (Comparative) | PA endcapped pPD PEI PEI 3 (Comparative) | Aniline endcapped mPD PEI PEI 1 (Invention) | Aniline endcapped pPD PEI PEI 4 (Invention) |
| Tensile Strength at Yield in Kpsi (MPa) | 15.2 (105) | 14.6 (101) | 15.4 (106) | 14.5 (100) |
| Tensile Modulus in Kpsi (MPa) | 480 (3307) | 420 (2894) | 490 (3376) | 420 (2894) |
| Tensile Elongation at Break (%) | 70 | 68 | 67 | 65 |
| HDT, 264 psi (1.8 MPa) in °C. | 194 | 206 | 195 | 203 |
| Glass Transition Temperature (Tg) in °C. | 217 | 225 | 218 | 222 |
| Viscosity Ratio of 100 sec$^{-1}$ and 5,000 sec$^{-1}$ at 340° C. | 6.5 | 9.9 | 7.3 | 10.3 |
| Melt Flow Rate (g/10 min) | 29.3 | 12.3 | 18.0 | 11.8 |

Film Preparation Properties

The films tested were made from the materials as follows. The film examples shown were made from the materials listed in Table 1 and were all prepared using a Dr. Collin 30 mm single screw extruder controlled at constant pressure mode outfitted with a Maag melt pump operating at 16 RPM for constant volumetric flow. Materials were dried at 6-8 hours in a dehumidifying dryer to a moisture level less than 0.02 wt. % prior to processing. Melt temperatures ranged from 350 to 365° C. depending on type of material and film thickness extruded. Material was extruded through a 450 mm wide Cloeren Epoch V die with a die lip gap setting of 300 micron. A 10 micron extruded film was formed onto a polished casting roll by drawing down the subsequent melt curtain at a continuous line speed of 14 meters per second and wound on a core for film testing.

Defects on and in the film were measured and counted with a Schenk Vision on-line scanner utilizing a Smart LINE-CAM 8000HS digital line CCD line scan camera with 8 micron per pixel resolution. The defects (counts) were classified according to size which ranged from less than 25 micron to exceeding greater than 100 micron in size. Films having a total defects counts more than 3000 were classified as films having an extruded polyetherimide film comprising less than 90 wt. % of the polyetherimide before extrusion, while films having total defects under or equal to 3000 defects were classified as films having an extruded polyetherimide film comprising more than 90 wt. % of the polyetherimide before extrusion.

Film Testing/Evaluation Procedures

The film test results reported in Table 4 were evaluated using the following test methods and procedures for films extruded by the procedure previously described. Extruded thin films of each material were tested for dielectric breakdown strength using ASTM D-149 test methods in Galden HT® oil. The oil was brought to test temperature using a hotplate/resistive coil. The electrodes consisted of a ¼ inch stainless steel ball on a 3 inch brass plate bottom electrode. The brass plate ramped at 500V/s using a Trek 30/20±30 kV DC high voltage power supply until the material electrically shorted and the voltage which caused the breakdown was recorded by Labview computer software. Dielectric breakdown strength was measured at 20° C., 50° C., 100° C., and 150° C. The reported values results from 20 samples at each temperature and the Weibull statistical analysis average was reported.

The dielectric constant and dissipation factor was measured on film samples by the following method. Gold, 100 nm thick, was deposited on 5 samples of each type of material through a 10 mm circular shadow mask by electron-beam evaporation as top electrodes. The bottom electrode consisted of Gold at 100 nm thickness over the area of the entire bottom of the sample. An Agilent E4980A Precision LCR Meter was used to measure capacitance and dissipation factor at an applied bias field. Dielectric constant was calculated using the diameter of the electrode (10 mm circular diameter electrode was used for all electrical tests) and film thickness. Film thickness was calculated using a Heidenhain Metro thickness gauge accurate to ±0.2 μm. The furnace temperature was varied from −40° C. to 150° C. and the LCR meter changed the frequency range from 100 Hz to 1 GHz at each respective temperature. A thermocouple inside the furnace connected to a digital multi-meter verified the furnace temperature.

Glass transition temperature (Tg) of the film was measured using Differential Scanning calorimetry (DSC) at a heating rate of 20° C./min to 300° C. with result reported on the second scan.

Tear strength of samples of the film taken in the machine direction and transverse direction were measured using Trouser Tear ASTM D1938 test method.

Dynamic and static coefficient of friction of the extruded film was measured in accordance with ASTM D1894 on an aluminum surface.

Results

Using the above-mentioned techniques the following results were obtained, as shown in Table 3 and Table 4. FIG. 1 summarizes the results of the defects for Example 1 and Example 2.

TABLE 3

| Defect Counts in Film - Schenk Optical Scanner | | | | | | |
|---|---|---|---|---|---|---|
| Example | Resin | Total Defects | <25 μm | 25-50 μm | 50-100 μm | >100 μm |
| 1 (Invention) | PEI 1 (Average) | 2947 | 791 | 480 | 607 | 1068 |
| 2 (Comparative) | PEI 2 (Comparative) | 3697 | 954 | 591 | 697 | 1455 |
| | % Change in counts | 20.3% | 17.0% | 18.7% | 12.9% | 26.6% |

Example 1

Discussion

Our results in Example 1, Table 3, show the extruded polyetherimide film made with the polyetherimide that was endcapped with the primary monoamine (PEI 1) performed better than the film made from the polyetherimide that was not endcapped with a primary monoamine (PEI 2). Further, our results show that the high yield extruded polyetherimide film comprised at least 90 wt. % of the polyetherimide before it was extruded.

More particularly, results in Table 3 show the influence and improvement in processability the primary monoamine endcapped has on reducing the total number of defects generated in the extruded film, the trend of defects with respect to time and the subsequent influence on yield of the extrusion process. It should be particularly noted the improvement the monoamine endcapped had on reducing the number of large defects >100 micron and defects in the size range of 50-100 micron which contribute to poor yield and processability of a material. Resin containing an aniline endcap shows more stable defect count over time compared to the control resin for which the defect count increases with respect to time. This reflects the challenge of using a material without an aniline endcap since the longer the material is processed the number and size of defects increases and subsequently leads to unacceptable process yield and poor utilization of the material. The aniline endcap polyetherimide is more stable and will stay in the film and not migrate and burn and char which is evident with the polyetherimide without an aniline endcap. In addition, visual defects such as die lines, inclusions, and smears aren't visually apparent since material is not collecting on any process surfaces and degrading. Both the shift in overall defect count and the increased stability of the aniline endcapped resin with respect to time provides an increase in overall machine utilization and production yield to increase.

Further, as indicated in Table 2 and 4, our data also show that the uniaxially-stretched, high yield extruded film made from PEI 1 had a weight average molecular weight of 20,000 to 400,000 Daltons, as determined by gel permeation chromatography based on a polystyrene standard; and a ratio of viscosity at 100 sec$^{-1}$ and 5,000 sec$^{-1}$ of less than 11 at 340° C. as measured by capillary rheometry; a tensile modulus of greater than or equal to 380,000 psi (2618 MPa) as determined by ASTM D638. The film had a glass transition temperature of greater than 210° C. or greater than 217° C., a heat distortion temperature of at least 195° C. as measured at 264 psi (1.8 MPa) according to ASTM D648 on a 0.250 inch (6.4 mm) thick test sample, a dielectric constant at 1 kHz, 23° C. and 50% RH of at least 3, a dissipation factor at 1 kHz, 23° C. and 50% RH of 1% or less, and a breakdown strength of at least 300 Volts/micrometer measured according to ASTM D-149.

Further, the film was entirely made from wrinkle-free regions, suggesting the film had a variation of the thickness of the film of +/−10% or less of the thickness of the film, and a surface roughness average (Ra) of less than +/−3% of the average thickness of the film. This was also visually apparent since winding the film on core resulted in no visual wrinkles or tears in the film.

Example 2

Discussion

Our results in Example 2 show that the extruded polyetherimide film made with the polyetherimide that was not endcapped with the primary monoamine performed significantly worse than a film that was made from the polyetherimide that was endcapped (PEI 1). The number of large defects was significantly higher than the material with aniline as the endcap. The number of defects increases with time since the material chars and burns as it collects on the die-lip surface and eventually falls on the passing web and subsequently becomes a defect in the film. This limits any potentially long production runs to a few hours since the problem requires cleanup from machine surfaces before yield can be re-established. The processability and thus yield decreases over time since the number of defects become too large to be useful in any application. In addition, visual defects such as die lines, inclusions and smears which don't necessarily become visual defects counted by an optical scanner is readily apparent by the naked eye which contributes to yield loss since it is unacceptable for form and function. The material without an aniline endcap defect count increased with respect to time and reduces overall machine utilization and production yield.

Example 3

Discussion

Our results in Example 1 show that the extruded polyetherimide film made with the polyetherimide that is endcapped with the aromatic primary monoamine (PEI 1) performs better than a film made from a polyetherimide that is not endcapped with a primary monoamine (PEI 2). The expected result for a material using an aniline endcap and a para-phenylene diamine (PEI 4) is a similar result since the materials are similar in chemical structure with mechanical properties and electrical properties typical of polyetherimide materials. They are in the same class of materials and in use the processing methods, temperatures, and pressures when processing. Further, our results show that the high yield extruded polyetherimide film comprises at least 90 wt. % of the polyetherimide before it was extruded would result when using this material

Example 4 (Comparative)

Discussion

Our results in Example 2 show that an extruded polyetherimide film made with the polyetherimide that was not endcapped with the aromatic primary monoamine (PEI 2) performed significantly worse than a the film that was made from the polyetherimide that was endcapped (PEI 1). Our results with a polyetherimide using para-phenylene diamine without a monoamine endcap would result in poor yields and short production runs. The material degrades and has significant levels of defects in the film which reduce production yields. The material is similar to polyetherimide using meta-phenylene diamine (PEI 2) in chemical structure and properties as expected since the materials belong to the same polyetherimide class of materials. Further, our results show films with yields below 90% result if the material is to be used in a similar fashion as a polyetherimide using meta-phenylene diamine without an aromatic primary monoamine endcap.

Examples 5-58

Material Properties

Film Testing Techniques

The film test results reported in Table 5 were evaluated using the following test methods and procedures for films extruded by the procedure previously described.

Extruded thin films of each material were tested for dielectric breakdown strength using ASTM D-149 test methods in Galden HT® oil. The oil was brought to test temperature using a hotplate/resistive coil. The electrodes consisted of a ¼ inch stainless steel ball on a 3 inch brass plate bottom electrode. The brass plate ramped at 500V/s using a Trek 30/20±30 kV DC high voltage power supply until the material electrically shorted and the voltage which caused the breakdown was recorded by Labview computer software. Dielectric breakdown strength was measured at 20° C., 50° C., 100° C., and 150° C. The reported values results from 20 samples at each temperature and the Weibull statistical analysis average was reported.

The dielectric constant and dissipation factor was measured on film samples by the following method. Gold, 100 nm thick, was deposited on 5 samples of each type of material through a 10 mm circular shadow mask by electron-beam evaporation as top electrodes. The bottom electrode consisted of Gold at 100 nm thickness over the area of the

| Name | Material | Description |
| --- | --- | --- |
| PEI 1 (Invention) | Polyetherimide that is endcapped with an aromatic primary monoamine | Polyetherimide that is aniline endcapped and using meta-phenylene diamine |
| PEI 2 (Comparative) | Control polyetherimide (Polyetherimide that is not endcapped with an aromatic primary monoamine). | Polyetherimide that is endcapped with phthalic anhydride and using meta-phenylene diamine |
| PEI 3 (Comparative) | Control polyetherimide (A chemical resistant Polyetherimide that is not endcapped with an aromatic primary monoamine). | Polyetherimide that is endcapped with phthalic anhydride and using para-phenylene diamine |
| PEI 4 (Invention) | A chemical resistant polyetherimide that is endcapped with an aromatic primary monoamine | Polyetherimide that is endcapped with aniline and using para-phenylene diamine |

Techniques & Procedures
Film Preparation Techniques

The films tested were made from the materials as follows. The film examples shown were made from the materials listed in Table 1 and were all prepared using a Dr. Collin 30 mm single screw extruder controlled at constant pressure mode outfitted with a Maag melt pump operating at 16 RPM for constant volumetric flow. Materials were dried at 6-8 hours in a dehumidifying dryer to a moisture level less than 0.02 wt. % prior to processing. Melt temperatures ranged from 350 to 365° C. depending on type of material and film thickness extruded. Material was extruded through a 450 mm wide Cloeren Epoch V die with a die lip gap setting of 300 micron. A 10 micron extruded film was formed onto a polished casting roll by drawing down the subsequent melt curtain at a continuous line speed of 14 meters per second and wound on a core for film testing.

entire bottom of the sample. An Agilent E4980A Precision LCR Meter was used to measure capacitance and dissipation factor at an applied bias field. Dielectric constant was calculated using the diameter of the electrode (10 mm circular diameter electrode was used for all electrical tests) and film thickness. Film thickness was calculated using a Heidenhain Metro thickness gauge accurate to ±0.2 µm. The furnace temperature was varied from −40° C. to 150° C. and the LCR meter changed the frequency range from 100 Hz to 1 GHz at each respective temperature. A thermocouple inside the furnace connected to a digital multi-meter verified the furnace temperature.

Glass transition temperature (Tg) of the film was measured using Differential Scanning calorimetry (DSC) at a heating rate of 20° C./min to 300° C. with result reported on the second scan.

Tear strength of samples of the film taken in the machine direction and transverse direction were measured using Trouser Tear ASTM D1938 test method.

Dynamic and static coefficient of friction of the extruded film was measured in accordance with ASTM D1894 on an aluminum surface.

The purpose of Examples 5-8 was to test key film properties made with the indicated polyetherimides to evaluate the effect of using an aromatic primary monoamine endcap (Aniline) has on film performance properties such as electrical, thermal, and mechanical properties. The results are presented in Table 4.

Results:

from 2.92 to 3.06 is a significant change as it affects the performance of a capacitor by changing the capacitance rating by 5%. Without being bound by theory, this allows the more energy to be stored and subsequently increases the energy density of the capacitor. The increase in dielectric constant without an increase in dissipation factor (energy losses in the form of heat) is a significant development since they are expected to increase together and it is unexpected to see only dielectric constant increase. Finally, it will be shown in later tables to be a consistent result as a function of temperature and frequency.

TABLE 4

Polyetherimide Film Properties

|  | Example 5 PA capped mPD PEI 2 (Comparative) | Example 6 PA capped pPD PEI PEI 3 (Comparative) | Example 7 Aniline capped mPD PEI 1 (Invention) | Example 8 Aniline capped pPD PEI 4 (Invention) |
|---|---|---|---|---|
| Glass Transition Temp (Tg) in ° C. | 216 | 223 | 218 | 221 |
| Tear Strength, 20 micron thickness, machine direction, in N/mm | 1.76 | 1.71 | 1.93 | 1.54 |
| Tear Strength, 20 micron thickness, transverse direction, in N/mm | 2.02 | 1.73 | 1.94 | 1.69 |
| Coefficient of Friction on Aluminum, static | 0.448 | 0.472 | 0.338 | 0.356 |
| Coefficient of Friction on Aluminum, dynamic | 0.375 | 0.376 | 0.223 | 0.261 |
| Dielectric Constant at 1 kHz, 73 F. ((23° C.) and 50% RH | 2.92 | 2.87 | 3.06 | 3.01 |
| Dissipation Factor at 1 kHz, 73 F. (23° C.), 50% RH as a % | 0.17 | 0.21 | 0.15 | 0.35 |
| Dielectric Breakdown strength, 73 F. (23° C.), 50% RH, 10 micron thickness in V/micron | 569 | 540 | 600 | 518 |

Discussion:

The results in Table 5 show films made from our invention had a dielectric constant at 1 kHz, 23° C. and 50% RH of at least 3, while the films that were not within the scope of our invention did not have a dielectric constant at 1 kHz, 23° C. and 50% RH of at least 3. An increase in dielectric constant Examples 9-61

The purpose of Examples 9-61 was to test key film properties made with the indicated polyetherimides to evaluate the effect of using an aromatic primary monoamine endcap (Aniline) has on film performance properties such as electrical, thermal and mechanical properties. The results are presented in the following tables:

Techniques & Procedures

The foregoing procedures for making films for testing films were used to in obtaining the following results.

Results

Results Indicating the Dielectric Constant of Films

TABLE 5

Dielectric Constant at 1 kHz - 10 Micron Film

| Example | Dielectric constant at 1 kHz, 50% RH (Temperature in ° C.) | PA Endcapped mPD PEI PEI 2 (Comparative) | Aniline Endcapped mPD PEI PEI 1 (Invention) |
|---|---|---|---|
| 9 | −40 | 2.89 | 3.04 |
| 10 | −20 | 2.89 | 3.04 |
| 11 | 0 | 2.91 | 3.06 |
| 12 | 20 | 2.92 | 3.06 |
| 13 | 40 | 2.91 | 3.06 |
| 14 | 60 | 2.89 | 3.04 |
| 15 | 80 | 2.87 | 3.02 |
| 16 | 100 | 2.86 | 3.01 |
| 17 | 120 | 2.86 | 3.00 |
| 18 | 140 | 2.86 | 3.01 |
| 19 | 150 | 2.86 | 3.01 |

Discussion:

The results in Table 6 show examples 9-19 comparing an aromatic primary monoamine endcap polyetherimide film resulted in materials with a dielectric constant at 1 kHz, 23° C. and 50% RH of at least 3, while the a polyetherimide without a monoamine were less than 3. An increase of approximately 5% resulted over the temperature range evaluated.

TABLE 6

Dielectric Constant at 1 MHz - 10 Micron Film

| Example | Dielectric constant at 1 MHz, 50% RH (Temperature, ° C.) | PA Endcapped mPD PEI PEI 2 (Comparative) | Aniline Endcapped mPD PEI PEI 1 (Invention) |
|---|---|---|---|
| 20 | −40 | 2.88 | 3.03 |
| 21 | −20 | 2.88 | 3.03 |
| 22 | 0 | 2.89 | 3.04 |
| 23 | 20 | 2.90 | 3.05 |
| 24 | 40 | 2.90 | 3.05 |
| 25 | 60 | 2.88 | 3.03 |
| 26 | 80 | 2.87 | 3.02 |
| 27 | 100 | 2.85 | 3.00 |
| 28 | 120 | 2.84 | 2.99 |
| 29 | 140 | 2.84 | 2.99 |
| 30 | 150 | 2.84 | 2.99 |

Discussion:

Our results indicated in Table 6 show that the films made from our invention had a dielectric constant at 1 MHz, 23° C. and 50% RH near 3, while the films that were not within the scope of our invention did not have a dielectric constant at 1 MHz, 23° C. and 50% RH of at least 3. As presented in examples 20-30, dielectric constant as function of temperature was stable as a function of temperature and changing by less than 2% when compared to value at 20 C for the invention material.

Results Indicating the Dissipation Factor of Films

TABLE 7

Dissipation Factor - 1 kHz - 10 Micron Film

| | Dissipation Factor at 1 kHz, 50% RH as a percent (Temperature, ° C.) | PA Endcapped mPD (PEI 2) | Aniline Endcapped mPD (PEI 1) | Yield more than 90% (PEI 1) | Yield more than 90% (PEI 2) |
|---|---|---|---|---|---|
| 31 | −40 | 0.254 | 0.252 | Yes | No |
| 32 | −20 | 0.217 | 0.209 | Yes | No |
| 33 | 0 | 0.169 | 0.168 | Yes | No |
| 34 | 20 | 0.157 | 0.153 | Yes | No |
| 35 | 40 | 0.168 | 0.168 | Yes | No |
| 36 | 60 | 0.191 | 0.192 | Yes | No |
| 37 | 80 | 0.221 | 0.221 | Yes | No |
| 38 | 100 | 0.254 | 0.252 | Yes | No |
| 39 | 120 | 0.274 | 0.274 | Yes | No |
| 40 | 140 | 0.289 | 0.289 | Yes | No |
| 41 | 150 | 0.299 | 0.294 | Yes | No |

Discussion:

The results in Table 7 present examples 31-41 for dissipation factor at 1 kHz, 23° C. and 50% relative humidity (RH) of 1% or less, the extruded polyetherimide film made in accordance to our invention comprised at least 90 wt. % of the polyetherimide before extrusion, while the films made with polyetherimide that were not in accordance to our invention (they were not endcapped with a primary monoamine) were made with less than 90 wt. % of the polyetherimide before extrusion. The quality and surface of the film was very good when using aromatic primary monoamine aniline and was without defects such as die lines, large inclusions, char and degraded polymer so the yield of the material was greater than 90% which was in contrast to the non-aniline endcapped material.

TABLE 8

Dissipation Factor - 1 MHz - 10 micron film

| | Dissipation Factor at 1 MHz, 50% RH as a percent (Temperature, ° C.) | PA Endcapped mPD PEI 2 (Comparative) | Aniline Endcapped mPD PEI 1 | Yield more than 90% (PEI 1) | Yield more than 90% (PEI 2) |
|---|---|---|---|---|---|
| 42 | −40 | 0.141 | 0.157 | Yes | No |
| 43 | −20 | 0.180 | 0.187 | Yes | No |
| 44 | 0 | 0.268 | 0.270 | Yes | No |
| 45 | 20 | 0.348 | 0.340 | Yes | No |
| 46 | 40 | 0.357 | 0.357 | Yes | No |
| 47 | 60 | 0.303 | 0.312 | Yes | No |
| 48 | 80 | 0.237 | 0.249 | Yes | No |
| 49 | 100 | 0.203 | 0.207 | Yes | No |
| 50 | 120 | 0.204 | 0.204 | Yes | No |
| 51 | 140 | 0.232 | 0.229 | Yes | No |
| 52 | 150 | 0.249 | 0.247 | Yes | No |

Discussion: Our results show that although the dissipation factor at 1 MHz, 23° C. and 50% RH of 1% or less, the extruded polyetherimide film made in accordance to our invention comprised at least 90 wt. % of the polyetherimide before extrusion, while the films made with polyetherimide that were not in accordance to our invention (they were not endcapped with a primary monoamine) were made with less than 90 wt. % of the polyetherimide before extrusion. Films made with our invention also met other features of our invention.

Results Indicating the Dielectric Constant of Films

TABLE 10

Dielectric Breakdown Strength - 10 Micron Thick Film

| Example | Breakdown Strength, 10 Micron Thickness, 50% RH in V/micron (Temperature, ° C.) | PA Endcapped mPD PEI (PEI 2) | Aniline Endcapped mPD PEI (PEI 1) | Yield more than 90% (PEI 1) | Yield more than 90% (PEI 2) |
|---|---|---|---|---|---|
| 53 | −40 | 692 | 600 | Yes | No |
| 54 | 23 | 594 | 588 | Yes | No |
| 55 | 50 | 576 | 595 | Yes | No |
| 56 | 100 | 612 | 587 | Yes | No |
| 57 | 135 | 589 | 576 | Yes | No |
| 58 | 150 | 581 | 550 | Yes | No |

Discussion:

Our results show that although both films exhibited a breakdown strength of at least 300 Volts/micrometer measured according to ASTM D-149, the extruded polyetherimide film made in accordance to our invention comprised at least 90 wt. % of the polyetherimide before extrusion, while the films made with polyetherimide that were not in accordance to our invention (they were not endcapped with a primary monoamine) were made with less than 90 wt. % of the polyetherimide before extrusion. Films made with our invention also met other features of our invention.

Set forth below are some embodiments of the polyetherimide films, articles comprising the films, and methods of manufacture.

In an embodiment, a polyetherimide film comprises: a fluoropolymer and an extruded polyetherimide comprising units derived from polymerization of an aromatic dianhydride with a diamine selected from a meta-phenylene diamine, a para-phenylene diamine, and a combination thereof, wherein the polyetherimide is endcapped with an a substituted or unsubstituted aromatic primary monoamine; and wherein the polyetherimide film comprises at least 90 wt. % of the polyetherimide before extrusion. The film has a thickness of more than 0 and less than 50 micrometers. Alternatively, the film has a thickness that is more than 0 and less than 10 micrometers.

The polyetherimide of any of the foregoing films has a weight average molecular weight of 20,000 to 400,000 Daltons, as determined by gel permeation chromatography based on a polystyrene standard; and a ratio of viscosity at 100 sec$^{-1}$ and 5,000 sec$^{-1}$ of less than 10 at 340° C. as measured by capillary rheometry; a tensile modulus of greater than or equal to 380,000 psi (2618 MPa) as determined by ASTM D638. The film has a glass transition temperature of greater than 210° C., or greater than 217° C., a heat distortion temperature of at least 195° C. as measured at 66 psi (0.45 MPa) according to ASTM D648 on a 0.125 inch (3.2 mm) thick test sample, a dielectric constant at 1 kHz, 23° C. and 50% RH of at least 3, a dissipation factor at 1 kHz, 23° C. and 50% RH of 1% or less, a breakdown strength of at least 300 Volts/micrometer measured according to ASTM D-149, and a wrinkle-free region having a variation of the thickness of the film of +/−10% or less of the thickness of the film, and a surface roughness average (Ra) of less than +/−3% of the average thickness of the film as measured by optical profilometry.

In another embodiment, the polyetherimide of the foregoing films has a weight average molecular weight of 20,000 to 400,000 Daltons, as determined by gel permeation chromatography based on a polystyrene standard; and a ratio of viscosity at 100 sec$^{-1}$ and 5,000 sec$^{-1}$ of less than 11 at 340° C. as measured by capillary rheometry; a tensile modulus of greater than or equal to 380,000 psi (2618 MPa) as determined by ASTM D638. The film has a glass transition temperature of greater than 210° C., or greater than 217° C., a heat distortion temperature was measured at measured at 264 psi (1.8 MPa) according to ASTM D648 on a 0.250 inch (6.4 mm), a dielectric constant at 1 kHz, 23° C. and 50% RH of at least 3, a dissipation factor at 1 kHz, 23° C. and 50% RH of 1% or less, a breakdown strength of at least 300 Volts/micrometer measured according to ASTM D-149, and a wrinkle-free region having a variation of the thickness of the film of +/−10% or less of the thickness of the film, and a surface roughness average (Ra) of less than +/−3% of the average thickness of the film as measured by optical profilometry.

In yet another embodiment, a polyetherimide film comprises a fluoropolymer and an extruded polyetherimide comprising units derived from polymerization of an aromatic dianhydride with a diamine selected from a meta-phenylene diamine, a para-phenylene diamine, and a combination thereof, wherein the polyetherimide is endcapped with an a substituted or unsubstituted aromatic primary monoamine; and wherein the polyetherimide film is solvent-free and comprises at least 90 wt. % of the polyetherimide before extrusion, and wherein the high yield extruded polyetherimide film has a thickness ranging from more than 0 to less than 10 micrometers.

In specific embodiments of the foregoing films, one or more of the following conditions can apply: the fluoropolymer comprises a perfluoroalkoxy polymer, a fluorinated ethylene propylene polymer, a polytetrafluoroethylene, a polyvinylfluoride, a polyvinylidene fluoride, a polychlorotrifluoroethylene, a polyethylenetetrafluoroethylene, a polyethylenechlorotrifluoroethylene, a perfluoropolyether, or a copolymer or a combination comprising at least one of the foregoing; the fluoropolymer comprises a perfluoroalkoxy polymer; the fluoropolymer is present in an amount of greater than zero to 20 wt. % based on the total weight of the polyetherimide film; the film has a dynamic and static coefficient of friction on steel, on a metallized surface, and on itself of less than 0.75 measured according to ASTM D1894; the film has a surface resistivity greater than 1E13

Ohm per square measured according to ASTM D257; the film dielectric constant at 1 kHz remains essentially unchanged from 0 to 175° C. with a difference of less than 20% of the highest dielectric constant value; the dissipation factor at 1 kHz remains essentially unchanged from 0 to 175° C., and is less than 1.3%; the dissipation factor is less than 1.3% from 1 kHz to 100 kHz at 23° C. and 50% RH; the breakdown strength difference of the film from 0 to 175° C. is less than 40% from the value at 23° C., measured according to ASTM D149; the difference in capacitance at 1 kHz is less than +/−5% from 0 to 175° C. based on the value at 23° C.; the polyetherimide is of the formula

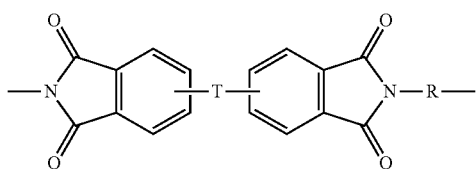

wherein T is —O— or a group of the formula —O—Z—O— wherein the divalent bonds of the —O— or the —O—Z—O— group are in the 3,3', 3,4', 4,3', or the 4,4' positions and Z is a divalent aromatic hydrocarbon group having 6 to 27 carbon atoms, a halogenated derivative thereof, a straight or branched chain alkylene group having 2 to 10 carbon atoms, a halogenated derivative thereof, a cycloalkylene group having 3 to 20 carbon atoms, a halogenated derivative thereof, or —($C_6H_{10}$)$_z$— wherein z is an integer from 1 to 4; and R is a residue of the diamine selected from the meta-phenylene diamine, para-phenylene diamine, and a combination thereof, specifically, Z is a divalent group having the formula

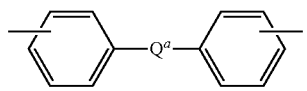

wherein $Q^a$ is a single bond, —O—, —S—, —C(O)—, —$SO_2$—, —SO—, and —$C_yH_{2y}$— and a halogenated derivative thereof wherein y is an integer from 1 to 5; T is

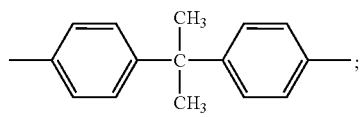

the polyetherimide comprises 1.0 to 1.4 molar equivalents of anhydride groups per 1.0 amine groups; the substituted or unsubstituted aromatic primary monoamine is selected from substituted and unsubstituted anilines, substituted and unsubstituted naphthyl primary amines, and substituted and unsubstituted heteroaryl primary amines, wherein substituents are selected from optionally halogenated $C_{6-12}$ aryl groups, optionally halogenated $C_{1-12}$ alkyl groups, sulfone groups, $C_{1-12}$ ester groups, $C_{1-12}$ amide groups, halogens, $C_{1-12}$ alkyl ether groups, $C_{6-12}$ aryl ether groups or $C_{6-12}$ aryl keto groups bonded to the aromatic ring; the substituted or unsubstituted aromatic primary monoamine is aniline; the film comprises a crosslinked polyetherimide, and wherein the film exhibits a breakdown strength from 5 to 50% more compared to a film comprising an uncrosslinked polyetherimide; the film comprises a branched polyetherimide, and wherein the film exhibits a breakdown strength that is from 5 to 50% more than a film that is the same except comprising an unbranched polyetherimide; the polyetherimide comprises 0 to 2 wt. % of a phosphorus-containing stabilizer having a molecular weight greater than or equal to 500 grams/mole; the film comprises less than 50 ppm of a hydroxyl group-containing compound; the film comprises less than 10 ppm each of a phthalic anhydride phenylene diamine or a phthalic anhydride phenylene diamine imide; the film comprises less than 10 ppm total of a phthalic anhydride phenylene diamine or a phthalic anhydride phenylene diamine imide; the film comprises less than 5 wt. % of a compound having a molecular weight of less than 500 Daltons based on the total weight of the film; the film comprises less than 1500 ppm of a halogen-containing compound; the film comprises less than 100 ppm of an alkali metal; the film comprises less than 0.1 ppm each of leachable low ionic chlorides and sulfates; the film comprises less than 1 ppm each of leachable low ionic chlorides and sulfates; the film comprises less than 10 ppm each of metal contaminants selected from Al, Ca, Cr, Fe, K, Mg, Na, Ni, and Ti; the film comprises less than 25 ppm each of metal contaminants selected from Al, Ca, Cr, Fe, K, Mg, Na, Ni, and Ti; the total amount of the metal contaminants in the film is less than 20 ppm; the total amount of the metal contaminants in the film is less than 100 ppm; the film further comprises 0.01 to 5.0 weight percent, based on total weight of the composition, of a release agent selected from $C_{15}$ to $C_{30}$ carboxylic acids, $C_{15}$ to $C_{30}$ aliphatic carboxylic amides, and mixtures thereof; the film further comprises less than 5.0 weight percent, based on total weight of the composition, of a release agent selected from $C_{15}$ to $C_{30}$ carboxylic acids, $C_{15}$ to $C_{30}$ aliphatic carboxylic amides, and mixtures thereof; the film further comprises 1 to 50 wt. %, based on total weight of the composition, of a polymer selected from a silicone polyetherimide, a polyetherimide sulfone, a polyester, a polycarbonate, a silicone polycarbonate-polyester copolymer, and a combination thereof; the film further comprises less than 20 wt. %, based on total weight of the composition, of a polymer selected from a silicone polyetherimide, a polyetherimide sulfone, a polyester, a polycarbonate, a silicone polycarbonate-polyester copolymer and a combination thereof; the film compress less than 15% of a polyetherimide other than the polyetherimide comprising units derived from polymerization of an amine selected from meta-phenylene diamines, para-phenylene diamines, and combinations thereof; the film comprises fewer than two carbonized inclusions having a diameter greater than 20 micrometers in an area of 100 $cm^2$; or the film has a single glass transition temperature greater than 150° C.; the film has a length of at least 10 meters, and a width of at least 300 millimeters, and at least 80% of the area of the film is the wrinkle-free region.

In another embodiment, an article comprising the uniaxially-stretched, high yield extruded film of any of the foregoing embodiments. The article can further comprise a layer of a conductive metal disposed on at least a portion of the film. One or more of the following conditions can apply to the article: the conductive metal comprises aluminum, zinc, copper, tantalum, niobium, brass, or a combination thereof; the conductive metal layer has a thickness of 1 to 3000 Angstroms; the conductive metal layer has a thickness of 1 to 2820 Angstroms; the conductive metal layer has a resistivity of 0.1 to 100 Ohm/sq; the conductive metal layer is deposited by chemical vapor deposition, atomic layer deposition, or by high temperature vacuum deposition. A capacitor can comprises a wound metallized film of any of the above embodiments. Also disclosed is an electronic article comprising the capacitor.

A method of manufacture of the uniaxially-stretched, high yield extruded film of the foregoing embodiments comprises extruding a quantity of the polyetherimide, wherein the extruded film comprises at least 90 weight % of the quantity of the polyetherimide before the extruding.

In specific embodiments of the foregoing method, one or more of the following conditions can apply: the method further comprises irradiating the extruded film at a wavelength and for a time effective to crosslink the polyetherimide; the film comprises the crosslinked polyetherimide exhibits an increase in breakdown strength of 5 to 50% more than the same film comprising an uncrosslinked polyetherimide; the film is extruded and not made from a solvent casting processes; or the film comprises less than 1000 ppm of a solvent.

What is claimed is:

1. A polyetherimide film comprising:
   a fluoropolymer; and
   an extruded polyetherimide comprising units derived from polymerization of an aromatic dianhydride with a diamine selected from a meta-phenylene diamine, a para-phenylene diamine, and a combination thereof, wherein the polyetherimide is endcapped with a substituted or unsubstituted aromatic primary monoamine selected from substituted and unsubstituted anilines, substituted and unsubstituted naphthyl primary amines, and substituted and unsubstituted heteroaryl primary amines, wherein the substituents are selected from optionally halogenated $C_{6-12}$ aryl groups, optionally halogenated $C_{1-12}$ alkyl groups, sulfone groups, $C_{1-12}$ ester groups, $C_{1-12}$ amide groups, halogens, $C_{1-12}$ alkyl ether groups, $C_{6-12}$ aryl ether groups or $C_{6-12}$ aryl keto groups bonded to the aromatic ring; and
   wherein the polyetherimide film comprises at least 90 weight percent of the polyetherimide before extrusion.

2. The polyetherimide film of claim 1, wherein the fluoropolymer comprises a perfluoroalkoxy polymer, a fluorinated ethylene propylene polymer, a polytetrafluoroethylene, a polyvinylfluoride, a polyvinylidene fluoride, a polychlorotrifluoroethylene, a polyethylenetetrafluoroethylene, a polyethylenechlorotrifluoroethylene, a perfluoropolyether, a copolymer comprising at least one of the foregoing, or a combination comprising at least one of the foregoing.

3. The polyetherimide film of claim 2, wherein the fluoropolymer comprises a perfluoroalkoxy polymer.

4. The polyetherimide film of claim 1, wherein the fluoropolymer is present in an amount of greater than zero to 20 wt. % based on the total weight of the polyetherimide film.

5. The polyetherimide film of claim 1, wherein the polyetherimide is of the formula

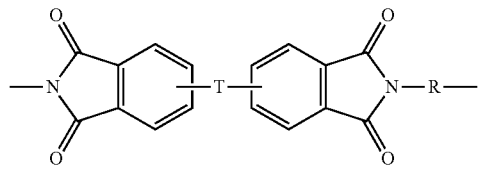

wherein
T is —O— or a group of the formula —O—Z—O— wherein the divalent bonds of the —O— or the —O— Z—O— group are in the 3,3', 3,4', 4,3', or the 4,4' positions and Z is a divalent aromatic hydrocarbon group having 6 to 27 carbon atoms, a halogenated derivative thereof, a straight or branched chain alkylene group having 2 to 10 carbon atoms, a halogenated derivative thereof, a cycloalkylene group having 3 to 20 carbon atoms, a halogenated derivative thereof, or —$(C_6H_{10})_z$— wherein z is an integer from 1 to 4; and
R is a residue of the diamine selected from the meta-phenylene diamine, para-phenylene diamine, and a combination thereof.

6. The polyetherimide film of claim 5, wherein Z is a divalent group having the formula

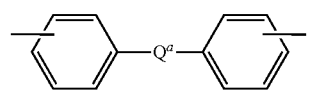

wherein $Q^a$ is a single bond, —O—, —S—, —C(O)—, —$SO_2$—, —SO—, and —$C_yH_{2y}$— and a halogenated derivative thereof wherein y is an integer from 1 to 5.

7. The polyetherimide film of claim 5, wherein T is

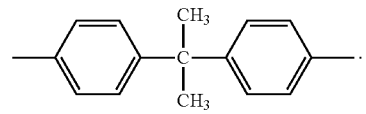

8. The polyetherimide film of claim 1, wherein the substituted or unsubstituted aromatic primary monoamine is aniline.

9. The polyetherimide film of claim 1, wherein the film comprises a crosslinked polyetherimide, and the film exhibits a breakdown strength that is from 5 to 50% more than a film comprising an uncrosslinked polyetherimide.

10. The polyetherimide film of claim 1, wherein the film comprises a branched polyetherimide, and the film exhibits a breakdown strength that is from 5 to 50% more than a film that is the same except comprising an unbranched polyetherimide.

11. The polyetherimide film of claim 1, wherein the film comprises 0 to 2 weight percent of a phosphorus-containing stabilizer having a molecular weight greater than or equal to 500 grams/mole.

12. The polyetherimide film of claim 1, wherein the film further comprises 0.01 to 5.0 weight percent, based on the total weight of the film, of a release agent selected from $C_{15}$ to $C_{30}$ carboxylic acids, $C_{15}$ to $C_{30}$ aliphatic carboxylic amides, and a combination thereof.

13. An article comprising the polyetherimide film of claim 1.

14. The article of claim 13, further comprising a layer of a conductive metal disposed on at least a portion of the film.

15. The article of claim 14, wherein the conductive metal comprises aluminum, zinc, copper, tantalum, niobium, brass, or a combination thereof.

16. A capacitor comprising the article of claim 14.

17. An electronic article comprising the capacitor of claim 16.

18. A method of manufacture of the film of claim 1, comprising extruding a quantity of the polyetherimide and a fluoropolymer, wherein the extruded film comprises at least 90 weight % of the quantity of the polyetherimide before the extruding.

19. The method of claim 18, further comprising irradiating the extruded film at a wavelength and for a time effective to crosslink the polyetherimide, wherein the film comprising the crosslinked polyetherimide exhibits an increase in breakdown strength of 5 to 50% more than the same film except for comprising an uncrosslinked polyetherimide.

20. A polyetherimide film comprising:
a fluoropolymer;
an extruded polyetherimide comprising units derived from polymerization of an aromatic dianhydride with a diamine selected from a meta-phenylene diamine, a para-phenylene diamine, and a combination thereof, wherein the polyetherimide is endcapped with a substituted or unsubstituted aromatic primary monoamine; and
1 to 50 weight percent, based on the total weight of the film, of a polymer selected from a silicone polyetherimide, a polyetherimide sulfone, a polyester, a polycarbonate, a silicone polycarbonate-polyester copolymer, and a combination thereof,
wherein the polyetherimide film comprises at least 90 weight percent of the polyetherimide before extrusion.

21. The film of claim 20, wherein the polymer is the polyetherimide sulfone.

22. The film of claim 20, wherein the substituted or unsubstituted aromatic primary monoamine is aniline.

23. A polyetherimide film comprising:
a fluoropolymer; and
an extruded polyetherimide comprising units derived from polymerization of an aromatic dianhydride with a diamine selected from a meta-phenylene diamine, a para-phenylene diamine, and a combination thereof, wherein the polyetherimide is endcapped with a substituted or unsubstituted aromatic primary monoamine; and
wherein the polyetherimide film comprises at least 90 weight percent of the polyetherimide before extrusion, and the polyetherimide film comprises less than 15% of a polyetherimide other than the polyetherimide comprising units derived from polymerization of an amine selected from meta-phenylene diamines, para-phenylene diamines, and combinations thereof.

* * * * *